United States Patent
Harms et al.

(10) Patent No.: US 11,782,391 B2
(45) Date of Patent: Oct. 10, 2023

(54) WALL CLOCK AI VOICE ASSISTANT

(71) Applicant: Samsung Electronics Co., Ltd., Suwon-si (KR)

(72) Inventors: Brian Harms, San Jose, CA (US); Cathy Kim, Sunnyvale, CA (US); Curtis Aumiller, San Jose, CA (US); Jack Thrun, Flanders, NJ (US); Jiawei Zhang, Sunnyvale, CA (US); Michael Noh, San Jose, CA (US); Pranav Mistry, Campbell, CA (US); Praveen Jayakumar, Union City, CA (US); Robert Wang, Somerville, MA (US); Ruokan He, Santa Clara, CA (US); Sajid Sadi, San Jose, CA (US); Thomas Brenner, Sunnyvale, CA (US); Anthony Liot, Cupertino, CA (US); Marc Estruch Tena, San Jose, CA (US); Ik Seon Kang, Seoul (KR); Cheoljun Lee, Seoul (KR); Younseong Kim, Seoul (KR); Bola Esther Yoo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 888 days.

(21) Appl. No.: 16/370,730

(22) Filed: Mar. 29, 2019

(65) Prior Publication Data

US 2020/0096945 A1   Mar. 26, 2020

Related U.S. Application Data

(60) Provisional application No. 62/736,384, filed on Sep. 25, 2018.

(51) Int. Cl.
*G04B 47/00* (2006.01)
*H04R 1/02* (2006.01)
(Continued)

(52) U.S. Cl.
CPC ............ *G04B 47/00* (2013.01); *G04G 21/06* (2013.01); *G06F 3/167* (2013.01); *H04R 1/028* (2013.01); *G06V 40/20* (2022.01)

(58) Field of Classification Search
CPC ........ G04B 47/00; G04B 47/02; G04G 21/06; G06F 3/167; H04R 1/028; G06V 40/20
See application file for complete search history.

(56) References Cited

U.S. PATENT DOCUMENTS

| 4,456,384 | A | * | 6/1984 | Murakami | G04B 37/1486 446/376 |
|---|---|---|---|---|---|
| 4,482,256 | A | * | 11/1984 | Matsuda | G04B 45/0069 968/390 |

(Continued)

FOREIGN PATENT DOCUMENTS

| CN | 103605281 A | 2/2014 |
|---|---|---|
| CN | 205450577 U | 8/2016 |

(Continued)

OTHER PUBLICATIONS

Notification of Transmittal of the International Search Report and the Written Opinion of the International Searching Authority, or the Declaration dated Jan. 2, 2020 in connection with International Patent Application No. PCT/KR2019/012396, 10pages.

(Continued)

*Primary Examiner* — Sean Kayes

(57) ABSTRACT

An apparatus and method for a wall clock AI voice assistant, such as a computing device, is provided herein. The wall-mountable electronic clock includes an optical sensor, a microphone, a digital display and a speaker. The optical sensor captures image data representing at least a portion of a user. The microphone receives an audio input from the user when certain criteria is met, such as when the image data representing at least a portion of the user is captured. The digital display provides visual information to the user pro- (Continued)

vided in response to the captured image data or the audio input. The speaker provides audio information provides from a digital voice assistant in response to the captured image data or the audio input.

21 Claims, 32 Drawing Sheets

(51) Int. Cl.
  *G04G 21/06* (2010.01)
  *G06F 3/16* (2006.01)
  *G06V 40/20* (2022.01)

(56) References Cited

U.S. PATENT DOCUMENTS

| | | | | |
|---|---|---|---|---|
| 5,329,501 A | * | 7/1994 | Meister | G04R 60/10 |
| | | | | 340/7.53 |
| 6,148,566 A | * | 11/2000 | Giszpenc | H04R 1/026 |
| | | | | 52/27 |
| 7,129,833 B2 | * | 10/2006 | Albert | G08B 21/22 |
| | | | | 340/517 |
| 7,170,404 B2 | * | 1/2007 | Albert | G08B 21/0469 |
| | | | | 340/517 |
| 8,593,912 B1 | * | 11/2013 | Amores | G04G 11/00 |
| | | | | 368/79 |
| 9,348,320 B1 | * | 5/2016 | Defazio | G04G 9/0064 |
| 10,088,809 B2 | * | 10/2018 | Lee | G04C 3/001 |
| 10,095,189 B2 | * | 10/2018 | Masserot | G04G 5/00 |
| 10,362,430 B2 | | 7/2019 | Son et al. | |
| 10,474,111 B2 | * | 11/2019 | Larkin | G04G 13/025 |
| 10,796,563 B1 | | 10/2020 | Bell | G10L 15/22 |
| 11,204,678 B1 | * | 12/2021 | Baker | G06F 3/04842 |
| 11,281,164 B1 | * | 3/2022 | Richards | G04G 9/00 |
| 2002/0085455 A1 | * | 7/2002 | Haida | G04B 37/1486 |
| | | | | 368/317 |
| 2005/0049850 A1 | * | 3/2005 | Porter | G04G 21/06 |
| | | | | 718/1 |
| 2009/0080293 A1 | | 3/2009 | Richman | |
| 2011/0126119 A1 | * | 5/2011 | Young | G06F 3/048 |
| | | | | 715/744 |
| 2013/0208576 A1 | * | 8/2013 | Loree, IV | G04G 11/00 |
| | | | | 368/256 |
| 2015/0160622 A1 | | 6/2015 | Kim et al. | |
| 2016/0058375 A1 | | 3/2016 | Rothkopf et al. | |
| 2017/0289252 A1 | | 10/2017 | Zriashchev et al. | |
| 2019/0195012 A1 | * | 6/2019 | Nagamine | A61B 5/486 |

FOREIGN PATENT DOCUMENTS

| | | |
|---|---|---|
| CN | 106231494 A | 12/2016 |
| CN | 107065506 A | 8/2017 |
| CN | 207352373 U | 5/2018 |
| CN | 207457716 U | 6/2018 |
| CN | 108490797 A | 9/2018 |
| KR | 20-0244793 Y1 | 10/2001 |
| KR | 10-2017-0066054 A | 6/2017 |
| KR | 10-2018-0056057 A | 5/2018 |
| WO | 2011124956 A1 | 10/2011 |
| WO | WO2017/095082 * | 6/2017 |
| WO | WO2017189618 A1 | 11/2017 |

OTHER PUBLICATIONS

Supplementary European Search Report dated Jul. 13, 2021 in connection with European Patent Application No. 19 86 4209, 7 pages.

Notification of the Second Office Action in connection with counterpart Chinese Patent Application No. 201980060342.3 dated Mar. 18, 2022, 20 pages.

Notification of the Second Office Action dated Aug. 31, 2022 in connection with Chinese Patent Application No. 201980060342.3, 17 pages.

Office Action dated Jan. 28, 2023 in connection with Chinese Patent Application No. 201980060342.3, 25 pages.

* cited by examiner

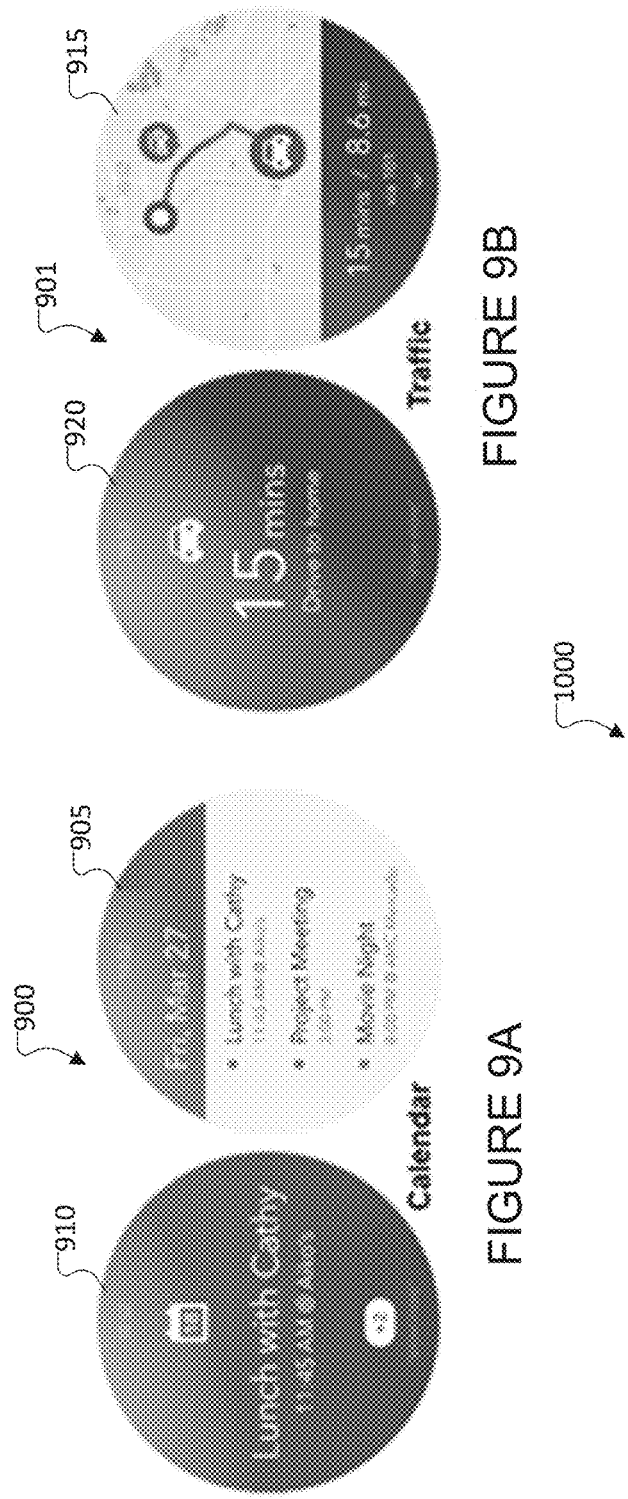
FIGURE 9A
FIGURE 9B
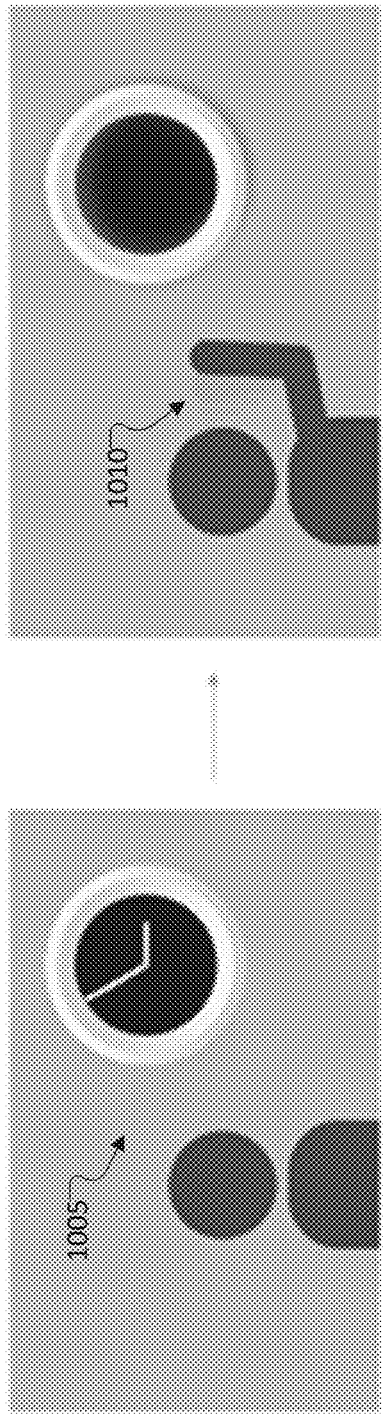
FIGURE 10A

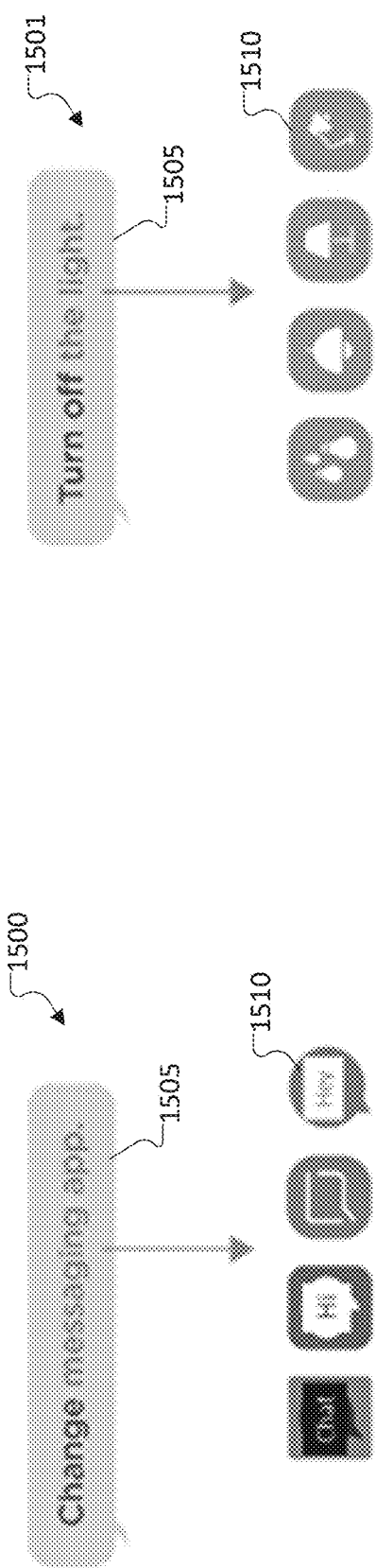
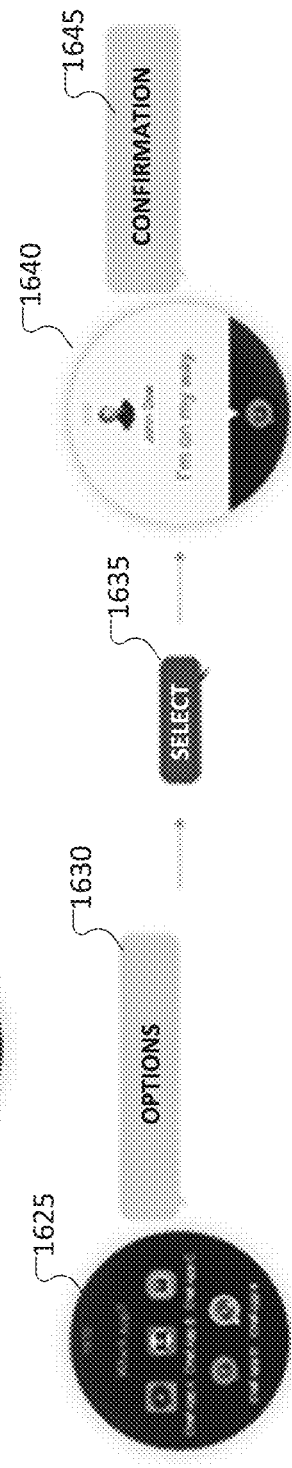
FIGURE 15A
FIGURE 15B
FIGURE 16A

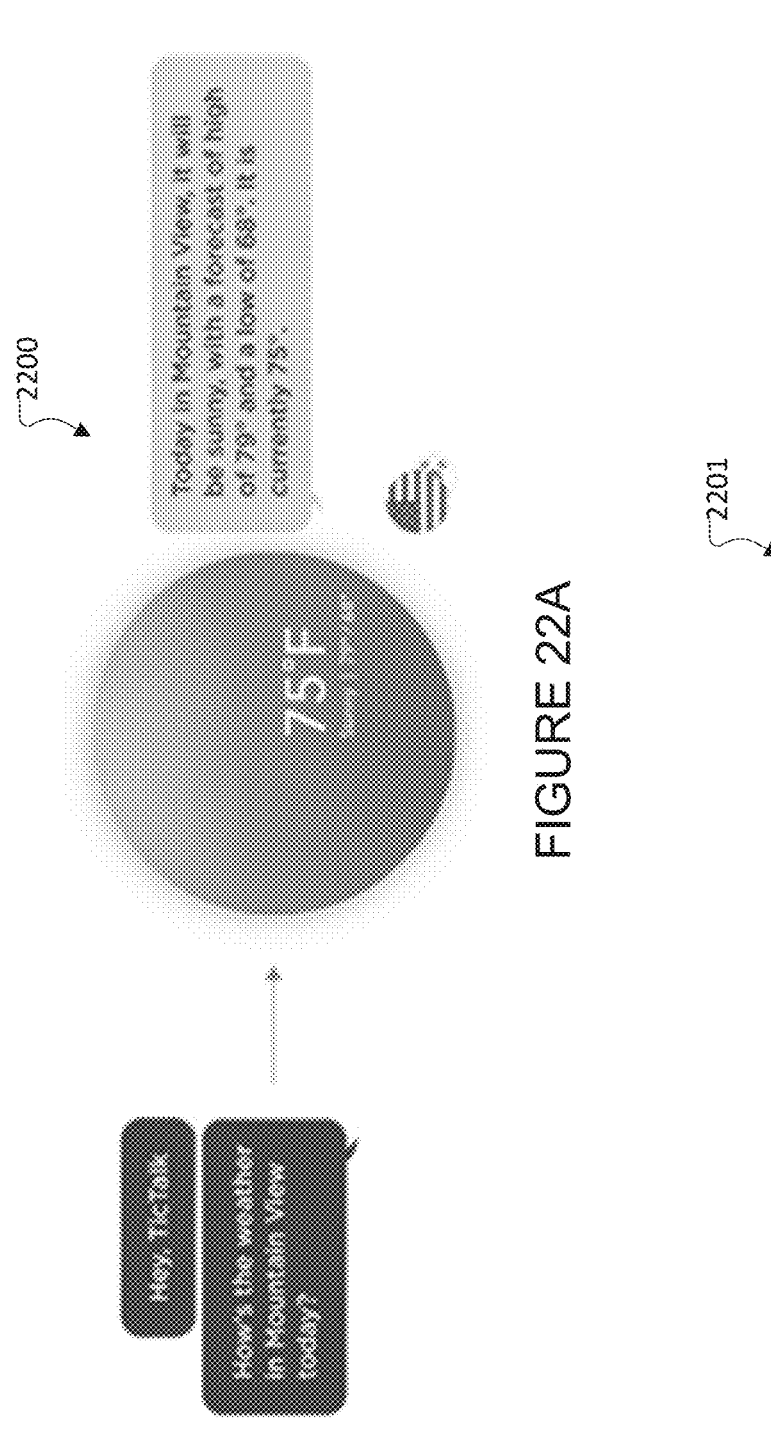
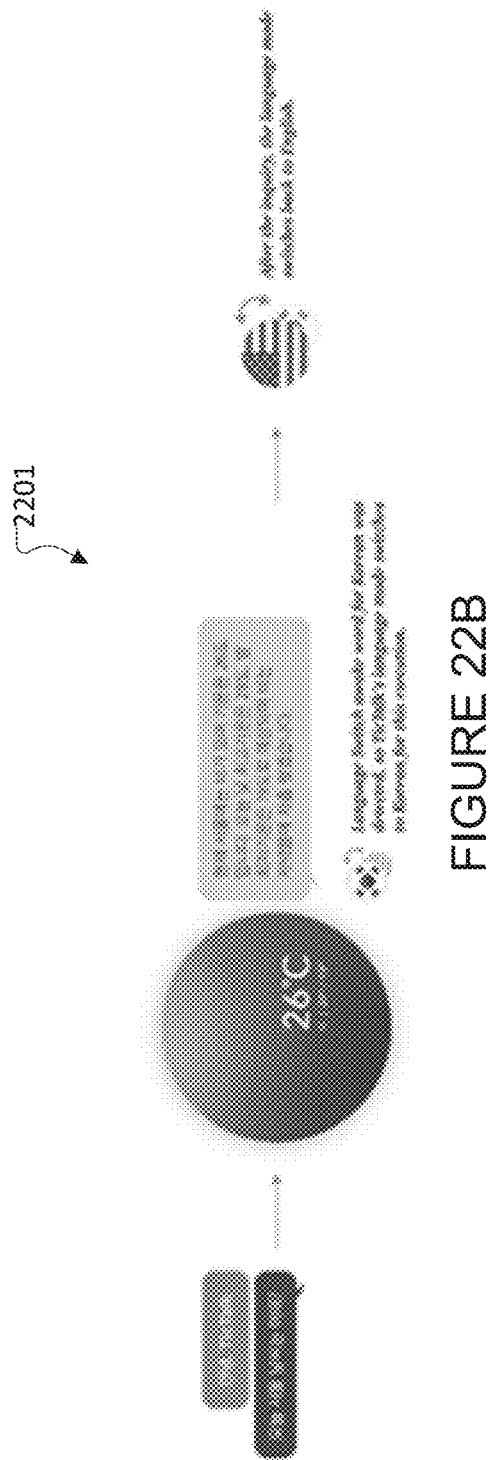
FIGURE 22A
FIGURE 22B

WALL CLOCK AI VOICE ASSISTANT

CROSS-REFERENCE TO RELATED APPLICATION(S) AND CLAIM OF PRIORITY

This application claims priority under 35 U.S.C. § 119(e) to U.S. Provisional Patent Application No. 62/736,384 filed on Sep. 25, 2018 and entitled "WALL CLOCK AI VOICE ASSISTANT". The above-identified provisional patent application is hereby incorporated by reference in its entirety.

TECHNICAL FIELD

This disclosure relates generally to a wall-mounted electronic clock. More specifically, this disclosure relates to a wall-mounted electronic clock AI assistant.

BACKGROUND

Providing information to a user from a conventional digital voice assistant can be cumbersome, inefficient, or difficult. For example, large amounts of information and/or certain types of information can be inefficient to express to the user in audible form (e.g., a digital conversation/report) by a conventional digital voice assistant.

Furthermore, conventional approaches to providing information to a user via a visual display may require the user to be nearby, since text and other visual information may be too small to be seen by the user at a distance. Also, when a user is far away from the visual display, less visual information can be easily seen on the display. Moreover, conventional digital voice assistants are generally not useful to users when they are not currently/actively being queried, playing audio, and/or presenting information. Furthermore, while a conventional digital voice assistant is providing or playing audio content and/or while there is background noise, it may be difficult for a user to get the assistant's attention (e.g., the assistant may not recognize its "wake" word). Additionally, a conventional digital voice assistant may not accurately identify users and may be limited in how many user profiles the assistant is able to "know" or recognize.

SUMMARY

This disclosure provides a system and method for a wall-mounted electronic clock AI voice assistant.

In a first embodiment, a wall-mountable clock is provided. The wall-mountable electronic clock includes an optical sensor (e.g., a camera), a microphone, a digital display and a speaker. The camera captures image data representing at least a portion of a user. In some instances, the camera can initiate capturing image data when one or more specified conditions or criteria are met. The microphone receives an audio input from the user. In some cases, the microphone can receive audio input when one or more specified conditions or criteria are met. In one example, the microphone receives the audio input from the user when one or more utterances (e.g., words, phrases, sentences, etc.) from the user are recognized. In another example, the microphone receives the audio input from the user when certain criteria is met, such as the image data representing at least a portion of the user is captured. The digital display provides visual information to the user, such as in response to the capture imaged data or the audio input. The speaker provides audio information from a digital voice assistant, such as in response to the captured image data or audio input.

In a second embodiment, a method for a wall-mounted electronic clock including a camera, a microphone, a digital display and a speaker is provided. The method includes capturing, by a camera of the wall-mountable electronic clock, image data representing at least a portion of a user; receiving, by a microphone of the wall-mountable electronic clock, an audio input from the user when certain criteria is met, such as when the image data representing at least a portion of the user is captured; providing, by a digital display of the wall-mountable electronic clock, visual information to the user provided in response to the captured image data or the audio input; and providing, by a speaker of the wall-mountable electronic clock, audio information provided from a digital voice assistant in response to the captured image date or the audio input.

In a third embodiment, a non-transitory computer readable medium is provided. The non-transitory computer readable medium includes a plurality of instructions that, when executed by a processor, are configured to cause the processor to: capture, using a camera of a wall-mountable electronic clock, image data representing at least a portion of a user; receive, using a microphone of the wall-mountable electronic clock, audio input from the user when certain criteria is met, such as when the image data representing at least a portion of the user is captured; provide, using a digital display of the wall-mountable electronic clock, visual information to the user provided in response to the captured image data or the audio input; and provide, using a speaker of the wall-mountable electronic clock, audio information provided from a digital voice assistant in response to the captured image data or the audio input.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used herein, the terms "have," "may have," "include," "may include," "can have," or "can include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the present disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts.

For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the present disclosure. It is to be understood that the singular forms "a," "'an," and "the" include plural references unless the context clearly dictates otherwise. All terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic accessory, an electronic tattoo, a smart mirror, or a smart watch).

Definitions for other certain words and phrases are provided throughout this patent document. Those of ordinary skill in the art should understand that in many if not most instances, such definitions apply to prior as well as future uses of such defined words and phrases.

According to embodiments of the present disclosure, the electronic device can be a smart home appliance. Examples of the smart home appliance can include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, APPLE TV™, or GOOGLE TV™), a gaming console (XBOX™, PLAYSTATION™), an electronic dictionary, an electronic key, a camcorder, or an electronic picture frame.

According to certain embodiments of the present disclosure, examples of the electronic device can include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MM) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to certain embodiments of the disclosure, the electronic device can be at least one of a part of a piece of furniture or building/structure, an electronic board, an electronic signature receiving device, a projector, or various measurement devices (e.g., devices for measuring water, electricity, gas, or electromagnetic waves).

According to embodiments of the present disclosure, the electronic device is one or a combination of the above-listed devices. According to embodiments of the present disclosure, the electronic device is a flexible electronic device. The electronic device disclosed herein is not limited to the above-listed devices, and can include new electronic devices depending on the development of technology.

As used herein, the term "user" may denote a human or another device (e.g., an artificial intelligent electronic device) using the electronic device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 9A and 9B illustrate exemplary proximity-based user interfaces of a wall clock AI voice assistant according to embodiments of the present disclosure;

FIGS. 10A, 10B, and 10C illustrate exemplary wave-to-wake interactions with the wall clock AI voice assistant according to embodiments of the present disclosure;

FIGS. 15A and 15B illustrate exemplary visual edit features on a wall clock AI voice assistant according to embodiments of the present disclosure;

FIGS. 16A and 16B illustrate exemplary visually-display edits on a wall clock AI voice assistant according to embodiments of the present disclosure;

FIGS. 22A and 22B illustrate exemplary switch interfaces on a wall clock AI voice assistant according to embodiments of the present disclosure;

DETAILED DESCRIPTION

FIGS. 1 through 33, discussed below, and the various embodiments used to describe the principles of this disclosure in this patent document are by way of illustration only and should not be construed in any way to limit the scope of the disclosure. Those skilled in the art will understand that the principles of this disclosure can be implemented in any suitably arranged wireless communication system.

Figure 1:
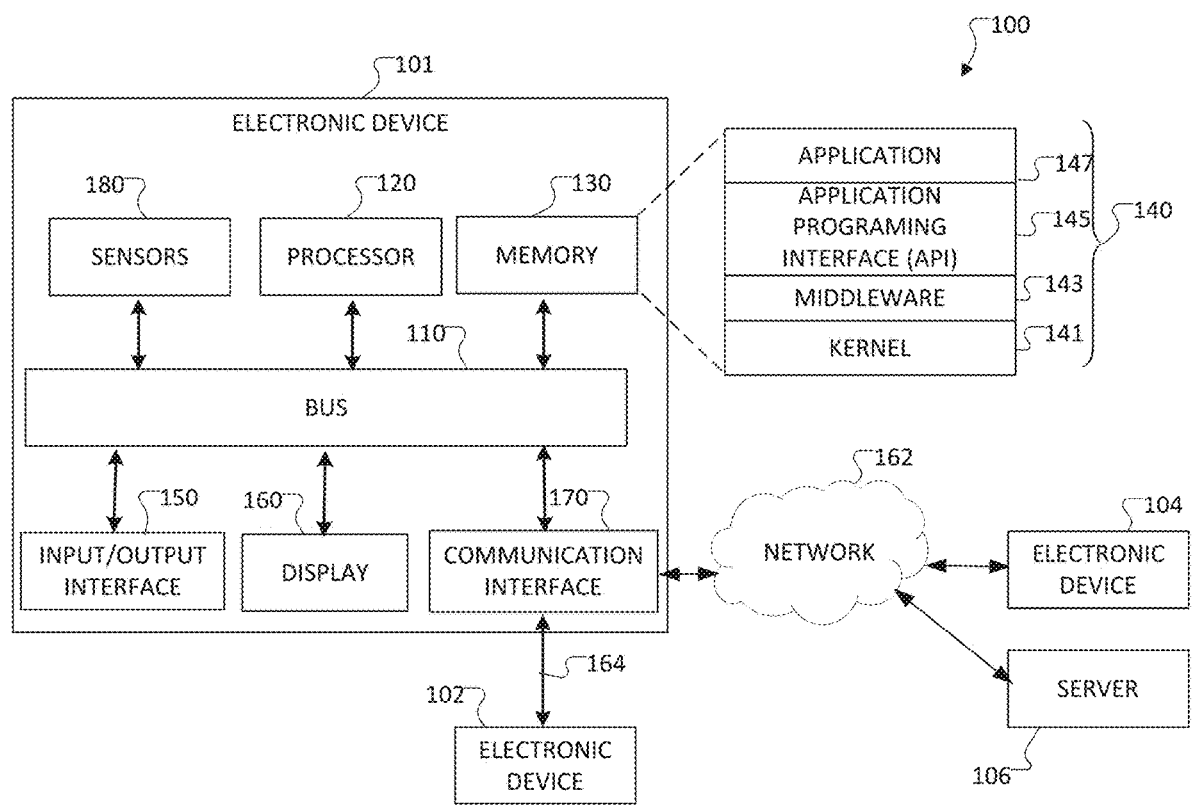
FIG. 1 illustrates an example of a network configuration according to an embodiment of this disclosure.

FIG. 1 illustrates an example network environment 100 according to various embodiments of the present disclosure. The embodiment of the network environment 100 shown in FIG. 1 is for illustration only. Other embodiments of the network environment 100 could be used without departing from the scope of this disclosure.

According to an embodiment of the present disclosure, an electronic device 101 is included in a network environment 100. The electronic device 101 can include at least one of a bus 110, a processor 120, a memory 130, an input/output (IO) interface 150, a display 160, a communication interface 170, or sensors 180. In some embodiments, the electronic device 101 can exclude at least one of the components or can add another component.

The bus 110 includes a circuit for connecting the components 120 to 170 with one another and transferring communications (e.g., control messages and/or data) between the components.

The processor 120 includes one or more of a central processing unit (CPU), an application processor (AP), or a communication processor (CP). The processor 120 is able to perform control on at least one of the other components of the electronic device 101, and/or perform an operation or data processing relating to communication.

For example, the processor 120 can capture, using a camera of a wall-mountable electronic clock, image data representing at least a portion of a user; receive, using a microphone of the wall-mountable electronic clock, audio input from the user when the image data representing at least a portion of the user is captured; provide, using a digital display of the wall-mountable electronic clock, visual information to the user provided in response to the audio input; and provide, using a speaker of the wall-mountable electronic clock, audio information provided from a digital voice assistant in response to the audio input.

The memory 130 can include a volatile and/or non-volatile memory. For example, the memory 130 can store commands or data related to at least one other component of the electronic device 101. In various embodiments, the memory 130 can store biometric information and personalized application information depending on the electronic device in which the memory 130 is included. According to an embodiment of the present disclosure, the memory 130 stores software and/or a program 140. The program 140 includes, e.g., a kernel 141, middleware 143, an application programming interface (API) 145, and/or an application program (or "application") 147. At least a portion of the kernel 141, middleware 143, or API 145 can be denoted an operating system (OS).

For example, the kernel 141 can control or manage system resources (e.g., the bus 110, processor 120, or a memory 130) used to perform operations or functions implemented in other programs (e.g., the middleware 143, API 145, or application program 147). The kernel 141 provides an interface that allows the middleware 143, the API 145, or the application 147 to access the individual components of the electronic device 101 to control or manage the system resources.

The middleware 143 can function as a relay to allow the API 145 or the application 147 to communicate data with the kernel 141, for example. A plurality of applications 147 can be provided. The middleware 143 is able to control work requests received from the applications 147, e.g., by allocating the priority of using the system resources of the electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (e.g., a command) for filing control, window control, image processing, or text control.

The IO interface 150 serve as an interface that can, for example, transfer commands or data input from a user or other external devices to other component(s) of the electronic device 101. Further, the IO interface 150 can output commands or data received from other component(s) of the electronic device 101 to the user or the other external device.

The display 160 includes, e.g., a liquid crystal display (LCD), a light emitting diode (LED) display, an organic light emitting diode (OLED) display, or a microelectromechanical systems (MEMS) display, or an electronic paper display. The display 160 is able to display, for example, various contents (e.g., text, images, videos, icons, or symbols) to the user. The display 160 can include a touchscreen and may receive, for example, a touch, gesture, proximity or hovering input using an electronic pen or a body portion of the user.

For example, the communication interface 170 is able to set up communication between the electronic device 101 and an external electronic device (e.g., a first electronic device 102, a second external electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as biometric information, temporary passwords or codes, hashes, and the like.

Electronic device 101 further includes one or more sensors 180 that can meter a physical quantity or detect an activation state of the electronic device 101 and convert metered or detected information into an electrical signal. For example, sensor 180 can include one or more buttons for touch input, a camera, a gesture sensor, a gyroscope or gyro sensor, an air pressure sensor, a magnetic sensor or magnetometer, an acceleration sensor or accelerometer, a depth or distance sensor, a grip sensor, a proximity sensor, a color sensor (e.g., a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, and the like. The sensor(s) 180 can further include a control circuit for controlling at least one of the sensors included therein. Any of these sensor(s) 180 can be located within the electronic device 101. A camera sensor 180 can capture image data representing at least a portion of a user. A microphone sensor 180 can receive an audio input from the user when the image data representing the image data representing at least a portion of the user is captured.

The first external electronic device 102 or the second external electronic device 104 can be a wearable device or an electronic device 101-mountable wearable device (e.g., an optical head mounted display (HMD)). When the electronic device 101 is mounted in a HMD (e.g., the electronic device 102), the electronic device 101 is able to detect the mounting in the HMD and operate in an augmented reality mode. In certain embodiments, the electronic device 101 is able to detect the mounting in the HMD and operate in an augmented reality mode. When the electronic device 101 is mounted in the electronic device 102 (e.g., the HMD), the electronic device 101 can communicate with the electronic device 102 through the communication interface 170. The electronic device 101 can be directly connected with the electronic device 102 to communicate with the electronic device 102 without involving a separate network.

The wireless communication is able to use at least one of, e.g., long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS).

The network 162 includes at least one of communication networks. Examples of communication include a computer network (e.g., local area network (LAN) or wide area network (WAN)), Internet, or a telephone network.

The first and second external electronic devices 102 and 104 and server 106 each can be a device of the same or a different type from the electronic device 101. According to certain embodiments of the present disclosure, the server 106 includes a group of one or more servers. According to certain embodiments of the present disclosure, all or some of operations executed on the electronic device 101 can be executed on another or multiple other electronic devices (e.g., the electronic devices 102 and 104 or server 106). According to certain embodiments of the present disclosure, when the electronic device 101 should perform some function or service automatically or at a request, the electronic device 101, instead of executing the function or service on its own or additionally, can request another device (e.g., electronic devices 102 and 104 or server 106) to perform at least some functions associated therewith. The other electronic device (e.g., electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique can be used, for example.

Although FIG. 1 shows that the electronic device 101 includes the communication interface 170 to communicate with the external electronic device 104 or server 106 via the network 162, the electronic device 101 can be independently operated without a separate communication function, according to an embodiment of the present disclosure.

The server 106 can support to drive the electronic device 101 by performing at least one of operations (or functions) implemented on the electronic device 101. For example, the server 106 can include a processing module or processor that may support the processor 120 implemented in the electronic device 101.

Figure 2:
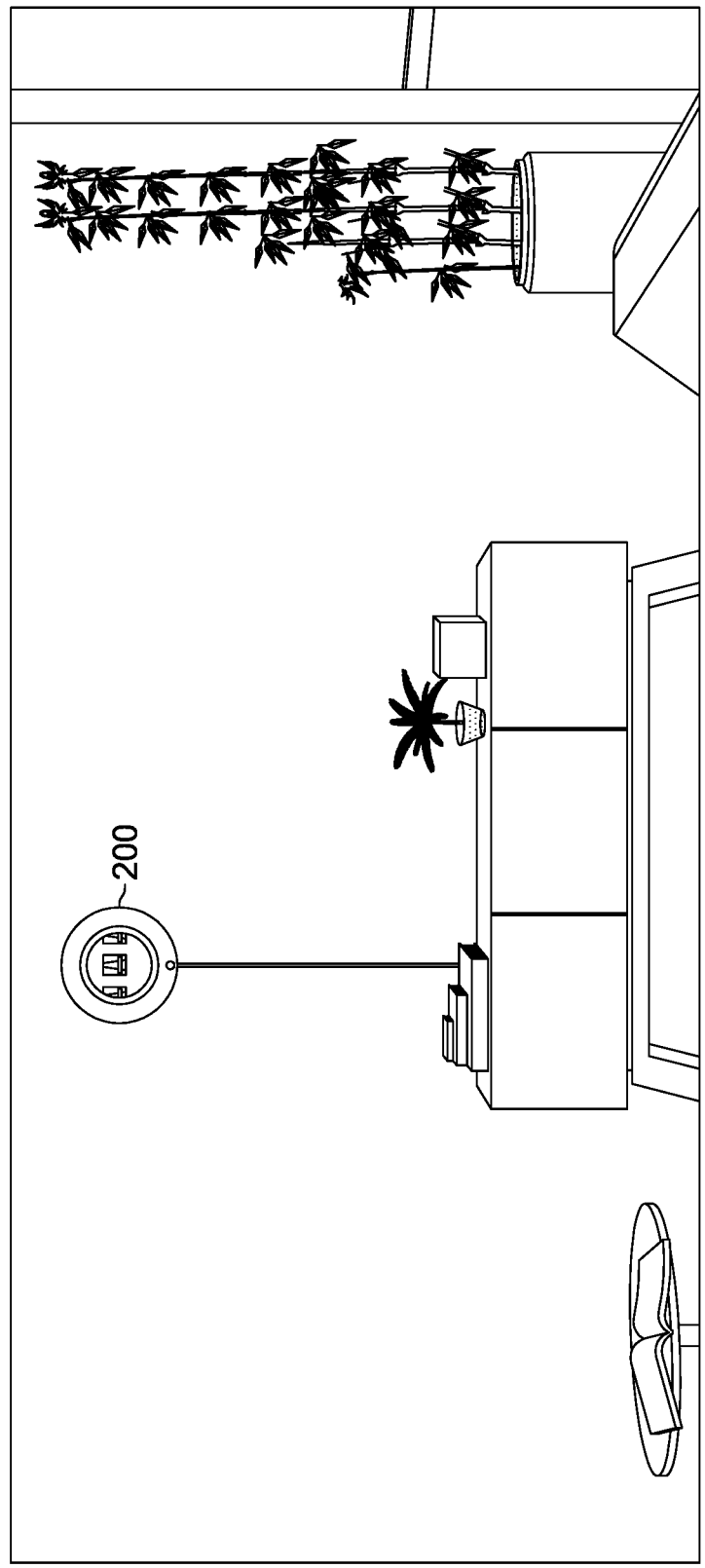
FIG. 2 illustrates an exemplary wall clock AI voice assistant according to embodiments of the present disclosure.

FIG. 2 illustrates an exemplary wall clock AI voice assistant 200 according to embodiments of the present disclosure. The embodiment of the wall clock AI voice assistant 200 shown in FIG. 2 is for illustration only. Other embodiments of wall clock AI voice assistant could be used without departing from the scope of this disclosure.

The wall clock AI voice assistant 200 can provide a wall-mountable electronic time instrument with an artificial intelligence (AI) voice assistant (e.g., a digital voice assistant). The wall clock AI voice assistant (i.e., wall-mountable digital voice assistant clock) 200 can include one or more displays, analog physical clock hands, speakers, and/or controllable lighting elements. The wall clock AI voice assistant 200 can also include one or more cameras and can utilize computer vision to address many issues associated with conventional approaches. In one example, when a user is far away from a display of the wall clock AI voice assistant 200, content provided via the display can be difficult for the user to see. The wall clock AI voice assistant 200 can utilize its camera(s) and computer vision to dynamically determine the user's distance. As such, in accordance with the wall clock AI voice assistant 200, the provided content can be dynamically changed and/or scaled based on the distance between the user and the wall clock AI voice assistant 200.

In some implementations, the wall clock AI voice assistant 200 can provide information in a passive manner, a secure manner, and/or an energy-efficient manner. In some embodiments, the wall clock AI voice assistant 200 can include one or more physical clock hands (e.g., an hour clock hand, a minute clock hand, a second clock hand). The one or more physical clock hands can enable the wall clock AI voice assistant 200 to provide utility (e.g., time-telling function) even when the wall clock AI voice assistant 200 is not currently/actively being queried, playing audio, and/or presenting other information, and the like. This also saves energy since the display does not have to be powered on to continuously display information.

Further, in some instances, such as when playing audio loudly, the wall clock AI voice assistant 200 can utilize computer vision to determine whether a user is attempting to get the attention of the wall clock AI voice assistant 200. For example, when playing music loudly, the wall clock AI voice assistant 200 may have difficulty recognizing its "wake" word and may thus use its camera(s) and computer vision to determine whether the user's mouth is appearing to utter the "wake" word and/or whether the user is making a gesture to wake the digital voice assistant clock.

Moreover, in some embodiments, the wall clock AI voice assistant 200 can include one or more controllable lighting elements. For instance, the wall clock AI voice assistant 200 can include at least one polar array of LEDs towards the rear of the device that, when turned on, illuminate the area of the wall (or mounting surface) around the device. This can allow the device to act as a lighting element in the user's home, to affect mood lighting, and/or to convey information to the user.

Furthermore, in some cases, there can be multiple users and/or multiple user profiles. The wall clock AI voice assistant 200 can utilize its camera(s) and computer vision to perform face detection/recognition (e.g., for user identification), object detection/recognition, and/or other computer vision processes. As such, the wall clock AI voice assistant 200 can provide personalization (e.g., a personalized experience) for each user. In some instances, the wall clock AI voice assistant 200 can also be operable as a family/home device (e.g., a hub). For example, the wall clock AI voice assistant 200 can connect with one or more other devices to be operable with a family/home profile.

In addition, face detection/recognition (e.g., for user identification) performed via the wall clock AI voice assistant 200 can also facilitate ensuring that privacy is maintained when conveying private messages or other information to users. In one example, if the digital voice assistant clock of the wall clock AI voice assistant 200 alerts a first user that he/she has received a message, the first user may want to be sure that other users in the vicinity cannot easily access the message if the first user's privacy settings require that he/she is to first be detected. In this example, the wall clock AI voice assistant 200 only reveals the message to the first user if only he/she is detected in the vicinity. Furthermore, face detection/recognition (e.g., for user identification) can also facilitate preventing certain users (e.g., guests, children, etc.) from accessing one or more features of the wall clock AI voice assistant 200 unless those certain users are included in an approved group or list of users. In another example, a parent may want to prevent his/her child from making purchases via the wall clock AI voice assistant 200. The wall clock AI voice assistant 200 can recognize or determine that the parent's child is attempting to make a purchase and can prevent the child from doing so.

Also, in some implementations, the wall clock AI voice assistant 200 can be configured to be operable with a set of one or more languages. For instance, the wall clock AI voice assistant 200 can recognize, understand, speak, play, display, output, switch among, and/or otherwise process at least two different languages. Accordingly, one user may speak to the wall clock AI voice assistant 200 in multiple languages, multiple users may each speak to the wall clock AI voice assistant 200 in a respective different language, and/or multiple users may each speak to the wall clock AI voice assistant 200 in multiple different languages.

Additionally, in some embodiments, the wall clock AI voice assistant 200 can provide more than only one-way communication. The wall clock AI voice assistant 200 can include a framework that supports a conversational UI (e.g., visual and/or audio) and/or multi-dimensional interaction, which facilitates the AI digital voice assistant to be more accurate and efficient. It is contemplated that there can be many variations associated with the wall clock AI voice assistant 200.

For simplicity of discussion, the wall clock AI voice assistant 200 can also be referred to as the wall clock 200.

Figure 3:
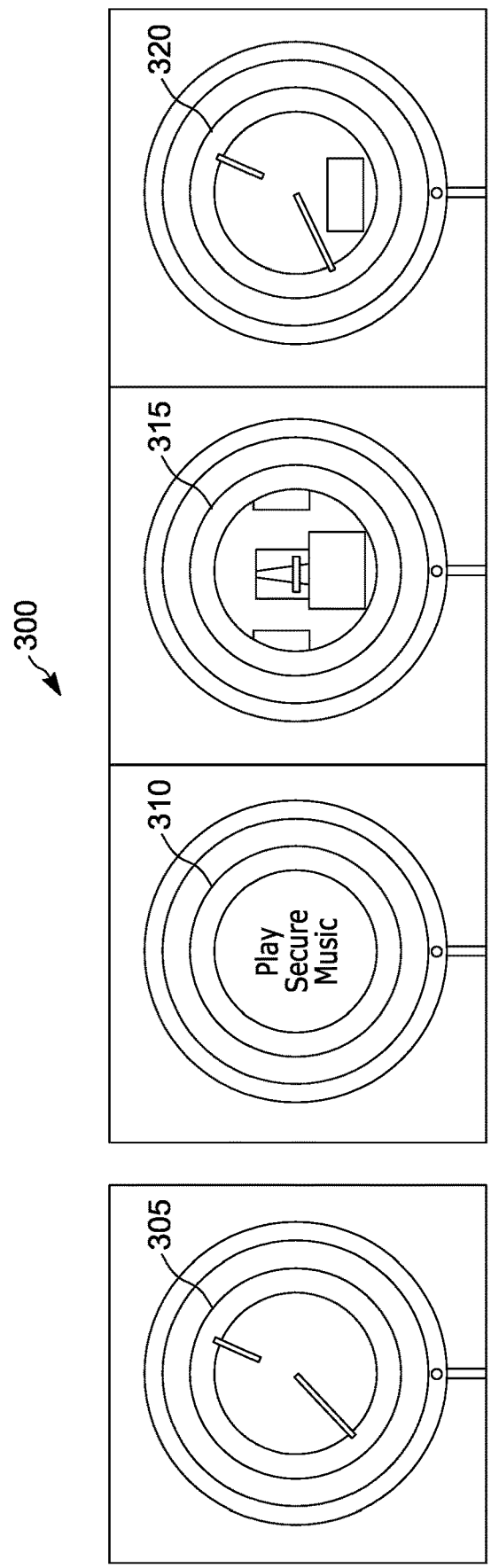
FIG. 3 illustrates an exemplary audio playback sequence of a wall clock AI voice assistant according to embodiments of the present disclosure.

FIG. 3 illustrates an example audio playback sequence 300 of a wall clock AI voice assistant according to embodiments of the present disclosure. The example embodiment of the audio playback sequence 300 shown in FIG. 3 is for illustration only. Other embodiments of audio playback sequence could be used without departing from the scope of this disclosure.

In operation 305, the wall clock 200 is operating in a regular operating mode as a typical wall clock. The hands (e.g., physical hands) of the wall clock 200 indicate the time of the day.

In operation 310, the wall clock 200 receives a cue (i.e., trigger, command, instruction, etc.) to play music. Once receiving the cue, the wall clock can hide the clock hands behind the display mask. The cue can be an audio cue or an optical cue. For example, the audio cue could be a user utterance, such as "play music," "play [Song Title ABC]," "play music from [Artist XYZ]," etc., and the optical cue could be a specific user gesture, a presence of any user, a presence of a specific recognized user, etc.

In operation 315, the wall clock 200 displays information related to the song and awaits confirmation. The information related to the song can include an album cover or picture associated with the song, lyrics for the song, and/or other details about the song, etc. The confirmation could include another gesture, a verbal confirmation, an elapse of a specified amount of time during which the user does not cancel, etc.

In operation 320, the wall clock 200 begins playing the song once confirmation is received. The wall clock 200 can unhide the clock hands and display the time. The wall clock 200 can display the same information in the background or reduced information. Again, many variations are possible.

Figure 4:
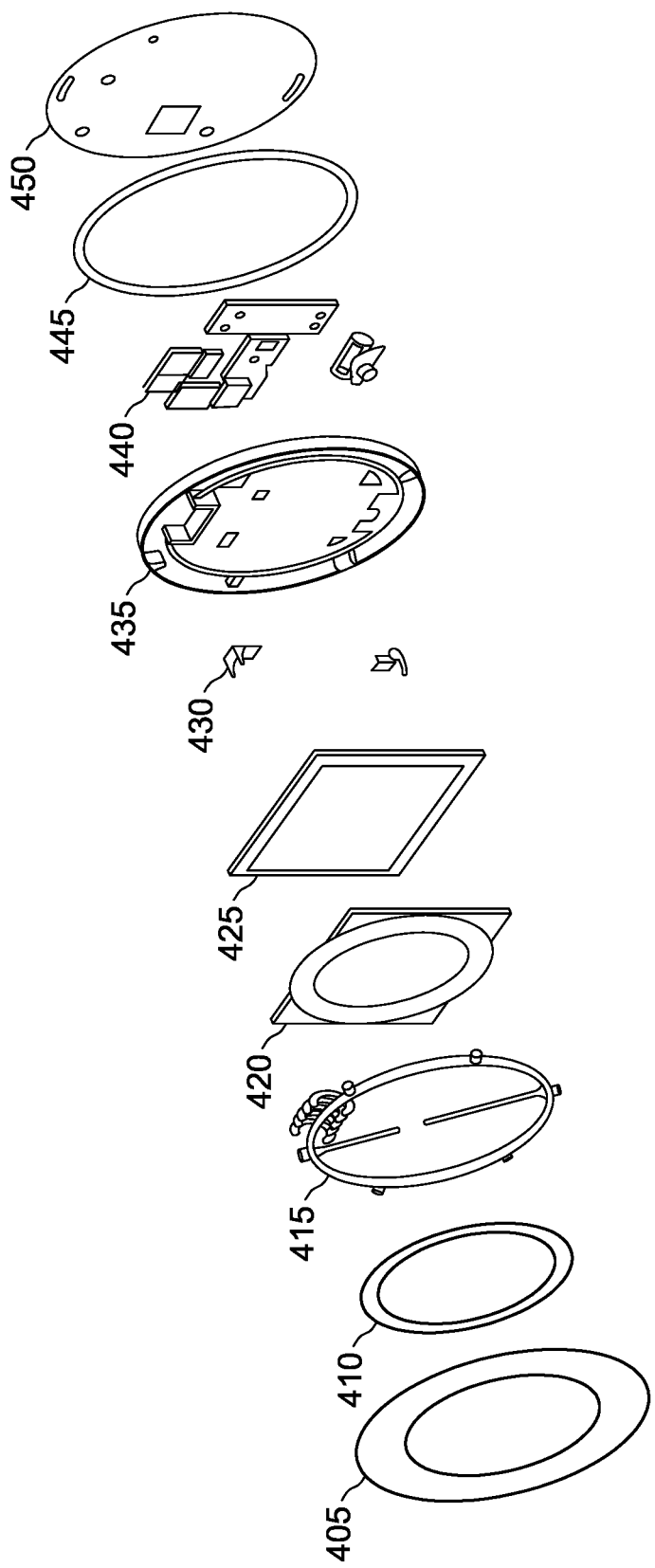
FIG. 4 illustrates exemplary components of a wall clock AI voice assistant according to embodiments of the present disclosure.

FIG. 4 illustrates exemplary components 400 of a wall clock AI voice assistant (e.g., wall clock 200) according to embodiments of the present disclosure. The embodiment of the components 400 shown in FIG. 4 is for illustration only. Other embodiments of components could be used without departing from the scope of this disclosure.

The components 400 of a wall clock AI voice assistant can include a bezel 405, a glass 410, a clock hand mechanisms 415, a display mask 420, a display 425, a plurality of servos 430, an armature 435, electronics 440, an LED strip 445, and a rear casing 450.

The bezel 405 is located at the front of the components 400. The bezel 405 is a grooved ring holding the glass 410 in position.

The glass 410 is located after the bezel. The glass 410 provides a transparent protective medium for the wall clock AI voice assistant.

The clock hand mechanisms 415 are located behind the glass 410. The clock hand mechanisms 415 have the appearance of regular clock hands through the glass 410. Each clock hand has a separate clock hand mechanism 415. The clock hand mechanisms 415 can rotate the clock hands and can hide the clock hands.

The display mask 420 is located after the clock hand mechanisms 415. The display mask 420 provides the aesthetics of a circular clock and also can be used to provide an area that the clock hands can be hidden from viewing through the glass 410.

The display 425 is located behind the display mask 420. The display 425 is controlled by the electronics 440 for displaying different features such as a clock face, functions of the AI assistant, etc. The display 425 can be combined with or can be operable with the physical clock hands for interactive displays (e.g., to generate an interactive user viewing experience, to generate a user viewing experience in which visual elements digitally displayed via the display 425 interact with the physical clock hands). The display 425 can function with the physical clock hands or independently or the physical clock hands when the clock hands are hidden. For example, a physical clock hand can be moved smoothly from the 9 o'clock position to the 3 o'clock position, with a video animation of a rainbow wiping into view along with the movement of the physical clock hand. In this way, the rainbow can appear as if it was revealed by the motion of the physical clock hands.

The plurality of servos 430 are located behind the display, but extend past the clock hand mechanisms 415. The servos 430 can be attached to the armature 435. The servos are used to limit the rotation of the clock hands when hidden behind the display mask 420. The servos 420 are used as a physical barrier into which the clock hands collide in a way that causes the clock hands to fold into a "retracted" state.

The armature 435 is located behind the display 425 and the servos 430. The armature provides support and attachments for the components 405-330. The armature 435 is the inner mounting structure of the wall clock AI voice assistant.

The electronics 440 are attached to a backside of the armature 435. The electronics 440 control the functionality of the components. For example, the electronics can rotate or hide the clock hands, can present a clock face on the display 425 inside an opening of the display mask 420, control the color or design of the LED strip 445, etc.

The LED strip 445 is located between the armature 435 and the rear casing 450. The LED strip 445 is positioned to project light (e.g., a color) around the fringe of the wall clock AI voice assistant. The LED strip 445 is controlled by the electronics 440 and can be adapted to change color based on a current function or command type of the wall clock AI voice assistant.

The LED strip 445 can wash the surface that the wall clock 200 is mounted to in light. Each LED is individually addressable so any combination of colors and brightness can be shown. Individually addressed LEDs can be used to display information to the users and also create enjoyable aesthetic effects. The information shown could be an indication of whether or not the user has a notification, or other useful information that can be abstractly represented by a series of controllable LEDs. For example, a controllable LED strip can be used to represent an amount of traffic along a morning commute.

The rear casing 450 is attached to the backside of the armature 435. The rear casing provides protection for the electronics 440 and the LED strip 445. The rear casing 450 can include mounts for attaching to a wall or standing on a surface, such as a table.

The wall clock 200 also includes physical analog clock hands that will be described in greater detail in FIGS. 25A and 25B.

The wall clock 200 provides a unique design and form factor for an AI assistant in a wall clock. The display 425 is a digital display screen that can convey relevant information at near and far distances. The wall clock 200 can convey information and change mood with lighting effects of the display 425 and the LED strip 445.

The wall clock 200 can provide a form of a classic wall clock. Accordingly, when mounted on a wall, the wall clock 200 of the present disclosure can provide a sense of familiarity to users, since classic wall clocks are also mounted on walls. Moreover, while the wall clock 200 can be mounted on a wall, it can also be placed on a shelf, a table, any flat surface, or anywhere it can be easily seen at a distance. Conventional voice assistants are generally not mounted on walls.

Figures 5A, 5B, 5C:
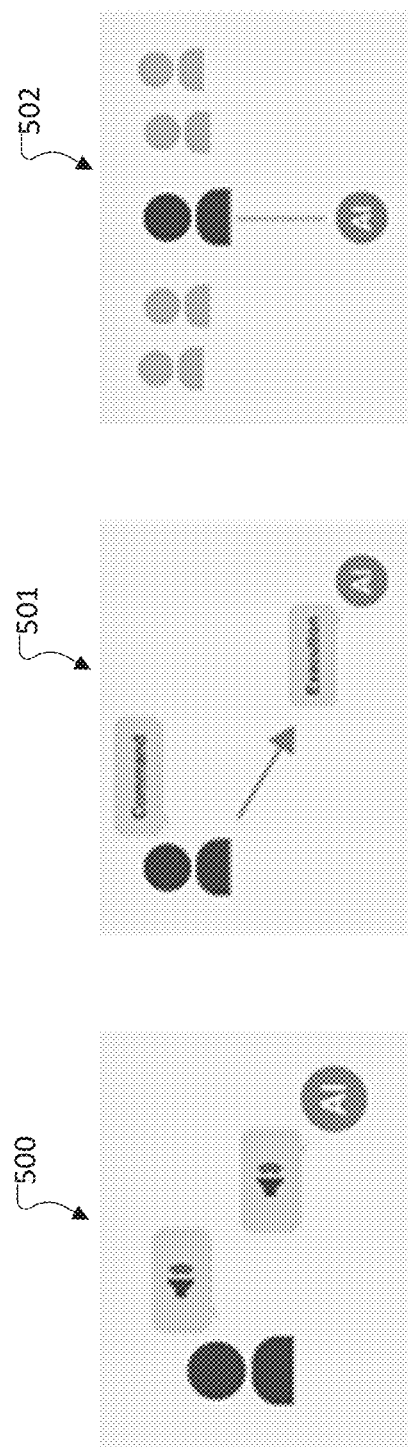
FIGS. 5A, 5B, and 5C illustrate exemplary limitations experienced by artificial intelligence according to embodiments of the present disclosure.

FIGS. 5A-5C illustrates exemplary limitations 500, 501, 502 experienced by artificial intelligence according to conventional approaches. The example limitations 500, 501, 502 shown in FIGS. 5A-5C are for illustration only.

FIG. 5A illustrates an example of conventional AI voice assistants encountering a one dimensional problem 500. Although communication is a multidimensional experience that goes beyond audio, conventional AI voice assistants typically only communicate through voice or audio.

FIG. 5B illustrates an example of conventional AI voice assistants encountering a one way problem 501. The user gives a command and a conventional AI voice assistant executes the command. The experience is one way, which makes the experience repetitive and degenerate in value much quicker.

FIG. 5C illustrates an example of conventional AI voice assistants encountering a limited scope problem 502. Only one user or a small number of users have the ability to go through an expansive experience.

The wall clock 200 addresses these problems 500, 501, 502. The wall clock 200 is multidimensional using both physical and digital interfaces, near and far interfaces, "wave to wake" (or "gesture to wake") interface, and a passive info feed interface. The wall clock 200 is conversational by incorporating visual commands, command suggestions, and visual edits. The wall clock 200 is inclusive, incorporating features such as family memo and language switch. The wall clock 200 is delightful by incorporating a "day to remember" feature. The solutions of the wall clock 200 to address these issues are further described below.

Figure 6:
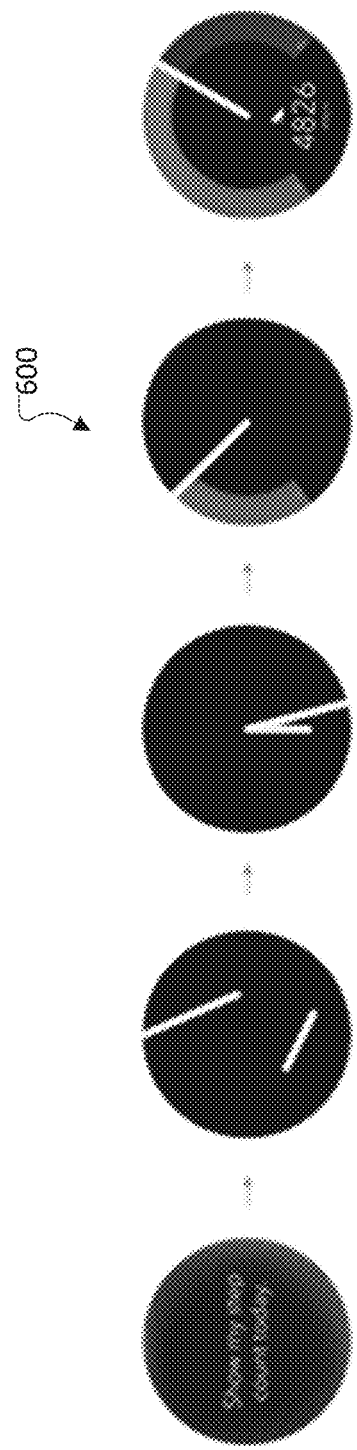
FIG. 6 illustrates an exemplary physical and digital interface of a wall clock AI voice assistant according to embodiments of the present disclosure.

FIG. 6 illustrates an exemplary physical and digital interface 600 of a wall clock AI voice assistant (i.e., wall clock 200) according to embodiments of the present disclosure. The embodiment of the physical and digital interface 600 shown in FIG. 6 is for illustration only. Other embodiments of physical and digital interface could be used without departing from the scope of this disclosure.

All good designs complement the form factor. A form of a chair can display how a user can relax on it. Based on understanding of gesture, the wall clock 200 provides a form factor that is intuitive. Even for a user interface, the wall clock 200 can suggest its functionality through its style and its composition of elements.

The wall clock AI voice assistant 200 can follow the form of a traditional wall clock, which has solid classic looking physical clock hands. Along with the versatile digital content, these classic physical clock hands align with the interface to become part of the information display.

For example, a user's current step count achievement level can be indicated, at least in part, by the physical clock hands. The wall clock 200 can indicate the command function received (e.g., a user uttered command "Show my step count today"). In this example, the physical clock hands are unhidden and combined with a digitally displayed progress meter/bar to become an indicator (e.g., step progress indicator "4826 steps") on a scale for steps towards an overall goal.

Figure 7:
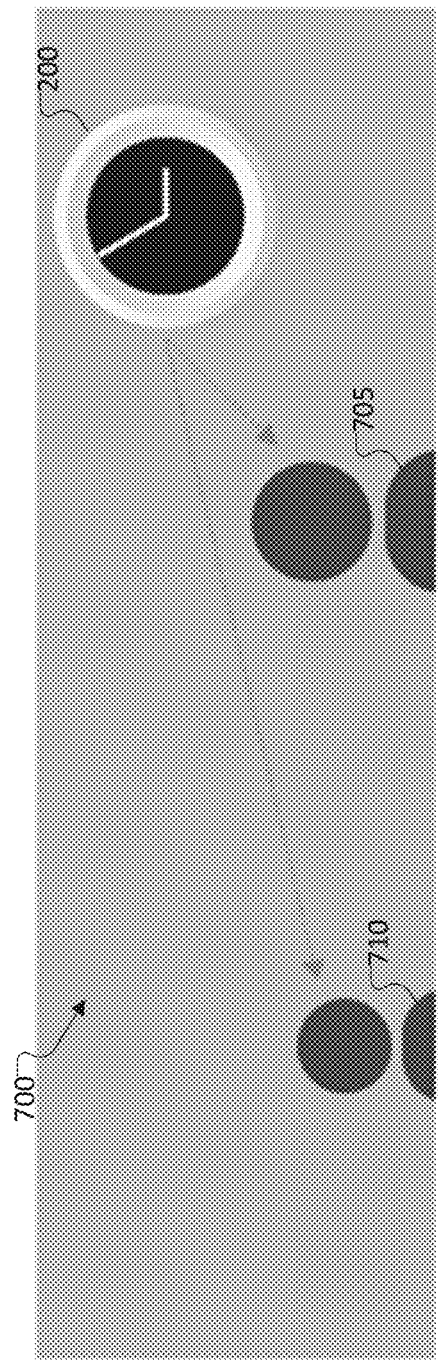
FIG. 7 illustrates an exemplary distance-based relationship between a user and a wall clock AI voice assistant according to embodiments of the present disclosure.

FIG. 7 illustrates an exemplary distance-based relationship 700 between a user and a wall clock AI voice assistant according to embodiments of the present disclosure. The embodiment of the distance-based relationship 700 shown in FIG. 7 is for illustration only. Other embodiments of distance-based relationship could be used without departing from the scope of this disclosure.

The distance-based relationship 700 is based on the distance from the wall clock 200 to a user. For example, a near user 705 and a far user 710 will be described, but the distance-based relationship could have a gradual setting for distance rather than an absolute setting for far and near. In other words, the adjustments can be gradual as the user approaches the wall clock 200 or moves away from the wall clock 200. A limit could also be set for the adjustments based being closer than a minimum distance from the wall clock 200 or further than a maximum distance from the wall clock 200.

Distance between the user and the device (e.g., wall clock 200) makes a difference in a user experience. Generally, a user has a higher visual understanding when they are closer to the device. Therefore, information can be provided differently (via a visual manner and/or via an audio manner) to better suit the user's situation (e.g., the user's distance from the wall clock 200).

Figure 8:
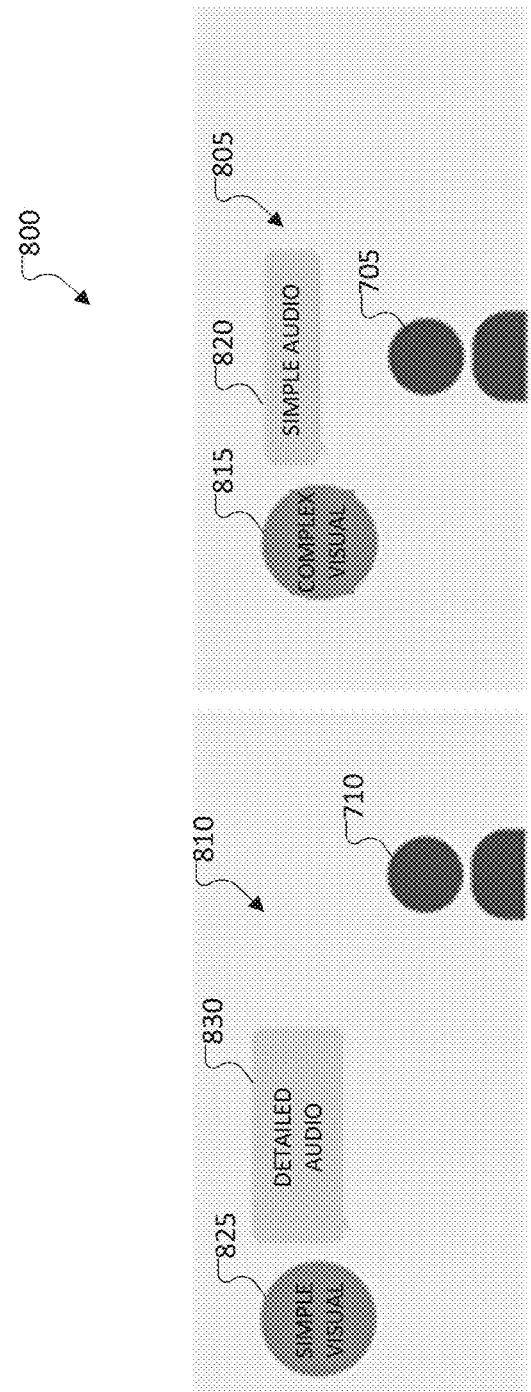
FIG. 8 illustrates an exemplary proximity-based relationship between a user and a wall clock AI voice assistant according to embodiments of the present disclosure.

FIG. 8 illustrates an exemplary proximity-based relationship 800 between a user and a wall clock AI voice assistant according to embodiments of the present disclosure. The embodiment of the proximity-based relationship 800 shown in FIG. 8 is for illustration only. Other embodiments of proximity-based relationship could be used without departing from the scope of this disclosure.

The wall clock 200 incorporates a proximity-based relationship 800 with a user. The wall clock 200 can provide different info delivery depending on the proximity of the user to the device (e.g., the wall clock 200) including a near view 805 and a far view 810. For the near view 805, such as when the user is a near user 705, the wall clock 200 can deliver a detailed visual UI 815 and with a simple audio response 820. For the far view 810, such as when the user is a far user 710, the wall clock 200 can deliver a simple visual UI 825 with a detail audio response 830.

FIGS. 9A and 9B illustrate exemplary proximity-based user interfaces 900, 901 of a wall clock AI voice assistant according to embodiments of the present disclosure. The example embodiments of the proximity-based user interfaces 900, 901 shown in FIGS. 9A and 9B are for illustration only. Other embodiments of proximity-based user interfaces could be used without departing from the scope of this disclosure.

Proximity based interface 900 illustrates an example of a calendar interface for a near view 905 and a far view 910. Proximity based interface 901 illustrates an example of a traffic interface for a near view 915 and a far view 920.

Figure 10B:
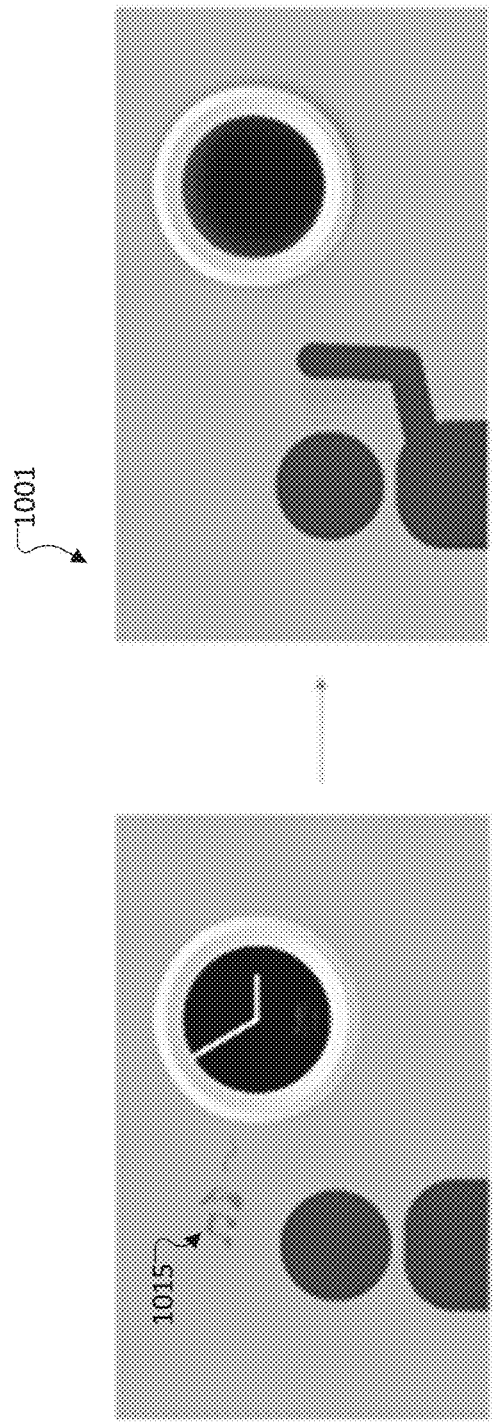
Figure 10C:
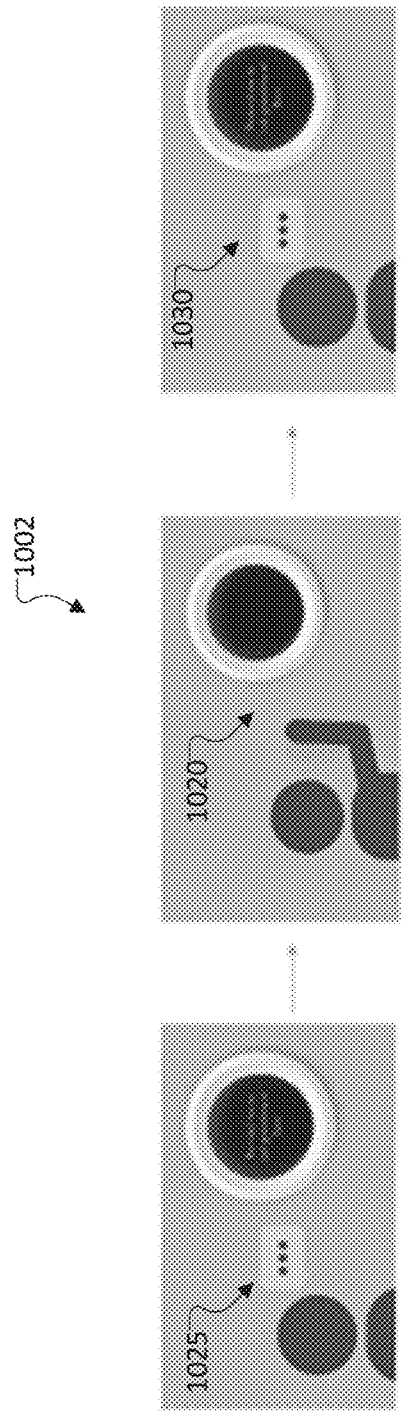

FIGS. 10A-10C illustrate exemplary wave-to-wake interactions 1000, 1001, 1002 with the wall clock AI voice assistant according to embodiments of the present disclosure. The embodiment of the wave-to-wake interactions

1000, 1001, 1002 shown in FIGS. 10A-10C are for illustration only. Other embodiments of wave-to-wake interactions could be used without departing from the scope of this disclosure.

Human communication is more than just words. In fact, it is a complex multichannel experience that involves body language, tonal change, contextual understanding, and more. Dependency on just the verbal communication can limit the way people converse with each other.

When a user is within a certain distance 1005, the user can perform a gesture 1010 toward the wall clock 200 to enable or activate its listening mode (or "awake" mode). In some implementations, the wall clock 200 can provide an indication that it is in the listening (or "awake" mode, such as by displaying text (e.g., "I'm listening . . . ", "Listening . . . ", or "How can I help?", etc.) via a display, producing sound via a speaker, and/or generating illumination via a light source (e.g., one or more LEDs). An example of a gesture 1010 could include waving, shaking their head, raising a hand, etc. When the wall clock 200 is switched to listening mode through the gesture, the wall clock 200 can understand the specific identity of the user, such as by facial recognition using an optical sensor (e.g., camera) communicatively connected to the wall clock 200.

In another example of a wave-to-wake interaction 1001, wave-to-wake can be helpful when the wall clock 200 is in a non-ideal audio situation 1015 for hearing a user's voice. A non-ideal audio situation 1015 could occur when the wall clock 200 is outputting audio that disrupts receiving a user's verbal command and/or when noise is coming from another source, such as one or more persons having a conversation in the room. For example, when the wall clock 200 is playing music, instead of a user shouting at the wall clock 200, the user can wave to initiate the listening mode.

In another example of a wave-to-wake interaction 1002, the wave-to-wake can be triggered in the midst of an already occurring interaction 1025. When the user is giving a command 1025, the user can perform a cancellation/interruption interaction or gesture 1020 with respect to the wall clock 200. The cancellation/interruption interaction 1020 can act as a reset trigger such as by interrupting and canceling the current command 1025. The user can then give another command 1030.

Figure 11:
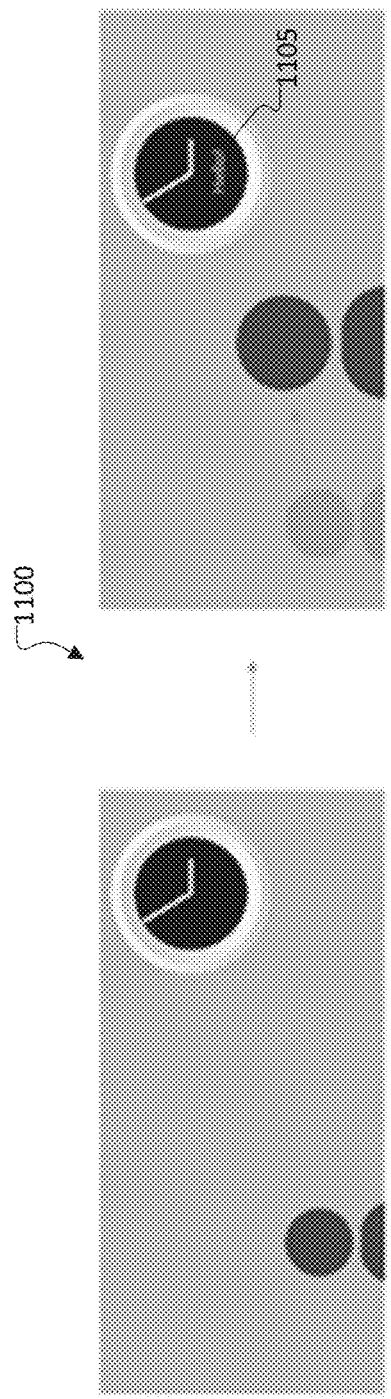
FIG. 11 illustrates an exemplary silent interaction between a user and a wall clock AI voice assistant according to embodiments of the present disclosure.

FIG. 11 illustrates an exemplary silent interaction 1100 between a user and a wall clock AI voice assistant according to embodiments of the present disclosure. The embodiment of the silent interaction 1100 shown in FIG. 11 is for illustration only. Other embodiments of silent interaction could be used without departing from the scope of this disclosure.

In some embodiments, the wall clock 200 includes a passive information feed. The passive information feed 1105 can be triggered by facial recognition. Digital assistants are good at communicating through voice, but situations can exist when speaking may not the best way to interact. The passive information feed 1105 can be configured to silently provide to users their most or frequently inquired information and/or other relevant information.

The passive information feed 1105 can be triggered simply by approaching and getting close to the wall clock 200. When the passive information feed 1105 is enabled, a user can get results for a most inquired or frequently inquired information by the user through simple text form when the user gets close to the wall clock 200. The passive info feed 1105 can utilize proximity sensing and facial recognition technology to provide a personalized experience. In one example, the wall clock 200 can be communicatively connected to an optical sensor to capture image data. Based on the image data, the wall clock 200 can perform image analysis and determine that a user is holding a sleeping baby. The wall clock 200 can then automatically switch to a silent mode (e.g., provide visual information to the user without audio, or provide visual information to the user with appropriate audio such as calming ambient noise or lullaby music).

Figure 12:
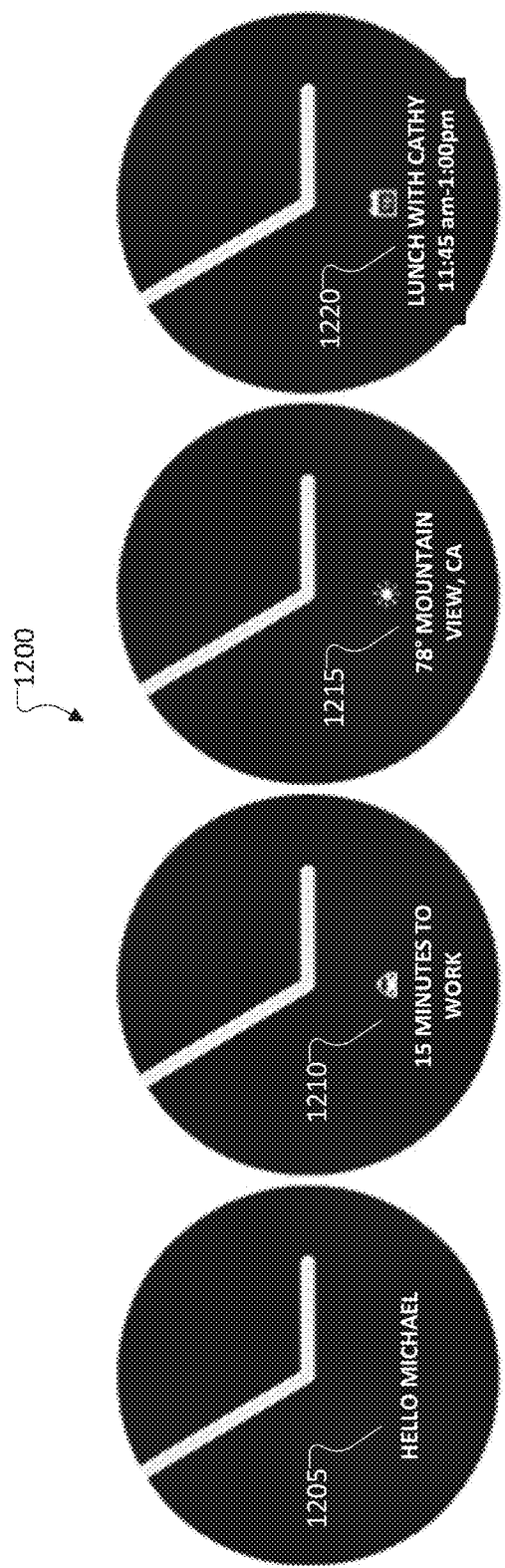
FIG. 12 illustrates an exemplary passive info feed for a wall clock AI voice assistant according to embodiments of the present disclosure.

FIG. 12 illustrates an exemplary passive info feed 1200 for a wall clock AI voice assistant according to embodiments of the present disclosure. The embodiment of the passive info feed 1200 shown in FIG. 12 is for illustration only. Other embodiments of passive info feed could be used without departing from the scope of this disclosure.

The examples of passive info feeds 1200 includes an introduction passive feed 1205, a commute passive feed 1210, a forecast passive feed 1215, and a calendar passive feed 1220. The introduction passive feed 1205 can include a personalized introduction upon recognizing the user. The commute passive feed 1210 can include a commute indicator and an amount of time to work. The forecast passive feed 1215 can include a weather indicator and a temperature for a specific location. The calendar passive feed 1220 can include a meeting description and a meeting time.

Figure 13:
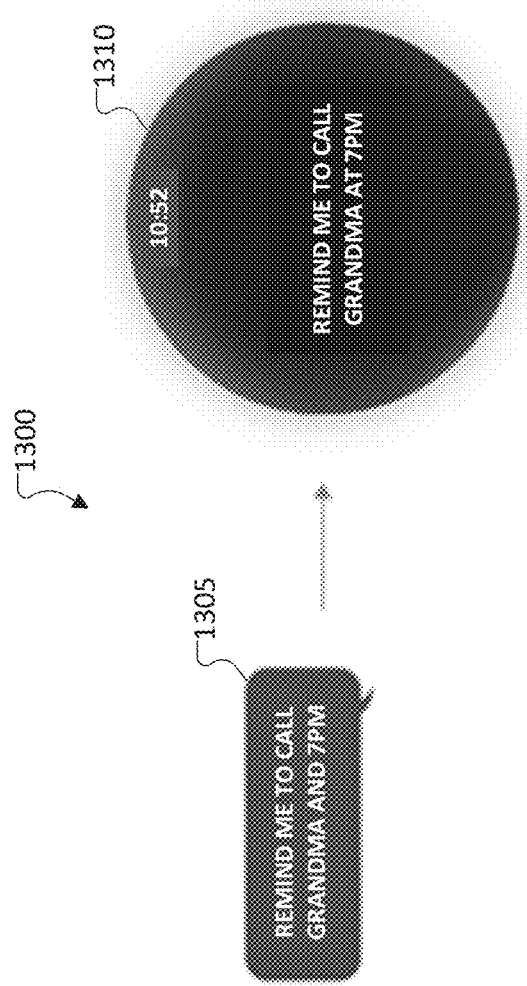
FIG. 13 illustrates an exemplary visualized command for a wall clock AI voice assistant according to embodiments of the present disclosure.

FIG. 13 illustrates an exemplary visualized command 1300 for a wall clock AI voice assistant according to embodiments of the present disclosure. The embodiment of the visualized command 1300 shown in FIG. 13 is for illustration only. Other embodiments of visualized command could be used without departing from the scope of this disclosure.

For a digital assistant that uses voice as the primary communication channel, it is important to let the user understand the command that is being input. The user can get confirmation on the voice input that is given to the wall clock 200. As a user provides a verbal command 1305, the wall clock can provide, such as in real-time, a visual description 1310 of the verbal command 1305. The visual description 1310 can give the user a visual confirmation of the verbal command 1305, and the visual description 1310 can help the user understand how the device is analyzing the verbal command 1305. For example, the verbal command 1305 could be "remind me to call grandma and 7 p.m." The wall clock 200 can analyze this verbal command 1305 and display "remind me to call grandma at 7 p.m."

Figure 14:
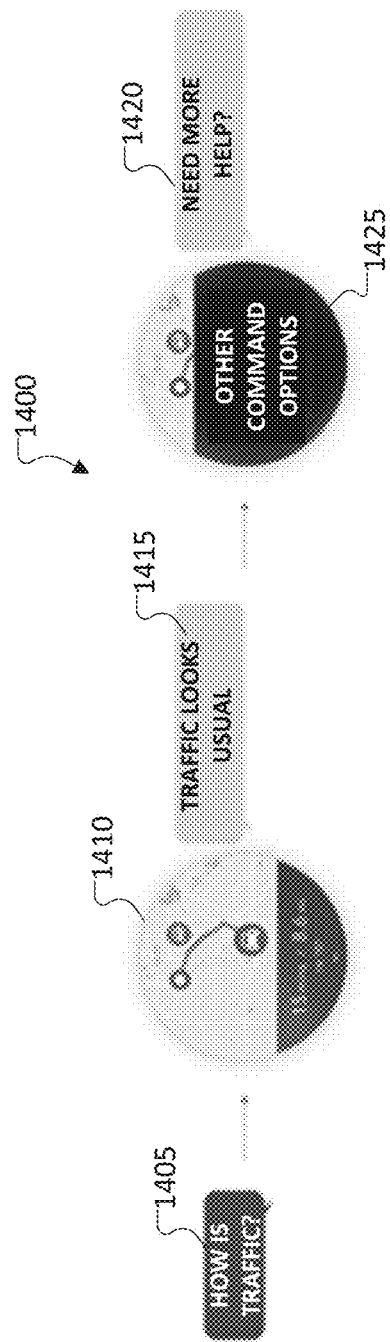
FIG. 14 illustrates an exemplary related suggestions according to embodiments of the present disclosure.

FIG. 14 illustrates an exemplary related suggestion 1400 according to embodiments of the present disclosure. The embodiment of the related suggestions 1400 shown in FIG. 14 is for illustration only. Other embodiments of related suggestions could be used without departing from the scope of this disclosure.

The related suggestions 1400 can be triggered by a user command 1405. The user command 1405 can be a text input command, a gesture command, a button command, or a verbal command, etc. The wall clock 200 can provide displayed information 1410 and audio information 1415 based on the user command 1405. After the wall clock 200 provides the information that was requested or inquired about by the user command 1405, other suggestions, options, or commands 1420 can be provided or displayed to the user. These other suggestions, options, or commands 1420 can be provided based on information that was requested or inquired about. Visualizations 1425 (e.g., "Text Joe my ETA", "Turn off lights", "Get me a ride", etc.) of these other suggestions, options, or commands 1420 can explain or indicate the verbal commands that the user can speak to initiate or execute further features of the wall clock 200 related to the user command 1405.

FIGS. 15A and 15B illustrate exemplary visual edit features 1500, 1501 on a wall clock AI voice assistant according to embodiments of the present disclosure. The embodiment of the visually-displayed choices 1500, 1501 shown in FIGS. 15A and 15B are for illustration only. Other embodiments of visually-displayed choices could be used without departing from the scope of this disclosure.

The wall clock 200 can provide an experience that combines audio and visual to efficiently edit and execute complex commands. One of the greatest strengths of having a visual display is the ability to ease complexity. By visually showing different options to clarify or specify an action, the wall clock 200 can make it easy to execute complex commands.

The wall clock 200 can provide visual edit features 1500, 1501. There are times when a given command 1505 is too vague for the wall clock 200 to execute. For these situations, a visual edit feature can display multiple choices 1510 for the user to check and choose. By doing this, the user does not have to re-do the whole command 1505 again. The complexity of the command 1505 is resolved through a conversation with the wall clock 200.

For example, in visual edit feature 1500, the wall clock 200 receives a command 1505 for changing an app displayed on the wall clock 200. The wall clock 200 displays multiple choices 1510 that are different applications that can be utilized by the wall clock 200. In visual edit feature 1501, the wall clock 200 receives a command 1505 for turning off a light that is connected to the wall clock 200. The wall clock 200 displays multiple choices 1510 that are lights communicatively connected to the wall clock 200. In certain embodiments, the wall clock 200 can determine whether a light is turned on for inclusion in the multiple choices 1510. In other words, the multiple choices 1510 may not include lights that are already turned off.

Figure 16B:
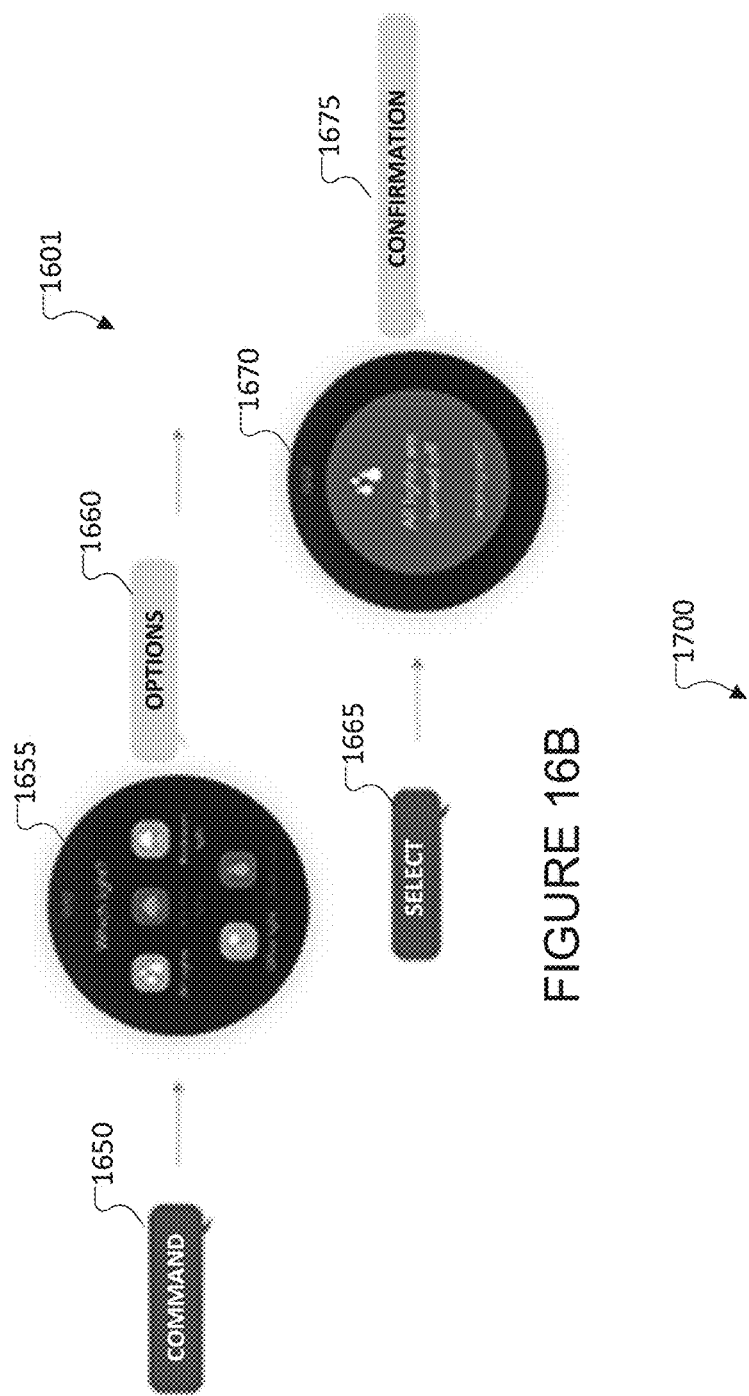

FIGS. 16A and 16B illustrate exemplary visually-display edits 1600, 1601 on a wall clock AI voice assistant according to embodiments of the present disclosure. The embodiment of the visually-display edits 1600, 1601 shown in FIGS. 16A and 16B are for illustration only. Other embodiments of visually-display edits could be used without departing from the scope of this disclosure.

In the example of FIG. 16A, visually-display edits 1600 provide an example for changing a messaging app before sending a message. The user provides a message command 1605 to the wall clock 200. The message command can include a person to send a message to and contents of the message. The wall clock 200 can display visual message information 1610 including an application icon, a picture of the contact, and the contents of the message. The wall clock 200 can provide auditory message information 1615 that can include the messaging application, the message content, the contact, and a confirmation. For example, message information can comprise "'Hey Messaging App' message created for John Doe. It says 'I'm on my way.' Should I send it?"

If the user needs to change or edit the message information 1610, 1615, the user can provide a change command 1620 to the wall clock 200. In an example, the change command 1620 (e.g., user utterance "change app") can include changing the messaging app that the wall clock 200 is using to send the message. The wall clock 200 can provide visual options 1625 and auditory options 1630 (e.g., wall clock response "Sure. Which app would you like to user?"). The applications provided in the visual options 1625 and the auditory options 1630 can be the same. If more options are available then what can be displayed conveniently on the display of the wall clock 200, the wall clock 200 can provide the extra alternatives through the auditory options 1630.

The user then provides a selection command 1635 (e.g., user utterance "Chat Messaging App") of one of the alternatives visual options 1625 or auditory options 1630. The wall clock 200 can display changed visual message information 1640 including an application icon for the newly user-selected app, a picture of the contact, and the contents of the message. The wall clock 200 can provide changed auditory message information 1645 that can include the newly user-selected messaging application, the message content, the contact, and a confirmation.

In the example of FIG. 16B, visually-display edits 1601 provides an example for changing lights before powering on or off. The user provides a command 1650 (e.g., user utterance "Turn off the light") to the wall clock 200. The command can indicate changing a setting of a connected appliance, such as a light. The wall clock 200 can provide visual options 1655 and auditory options 1660 (e.g., wall clock response "Ok. Which light?"). The wall clock 200 can display visual options 1655 including icons representing different lights that are connected to the wall clock 200. The wall clock 200 can display icons for lights that are not detected as "off". The wall clock 200 can provide auditory options 1660 that can include the description associated with the connected lights, such as "lamp in dining room" or "main lights in kitchen", etc.

The user then provides a selection command 1665 (e.g., user utterance "all lights") of one of the alternatives visual options 1655 or auditory options 1660. The wall clock 200 can display visual information 1670 including an indication that lights related to the selection command have been turned off. The wall clock 200 can provide auditory information 1675 that can include an indication that lights related to the selection command have been turned off. For example, the information 1670 and 1675 can include "All lights are turned off"

Figure 17:
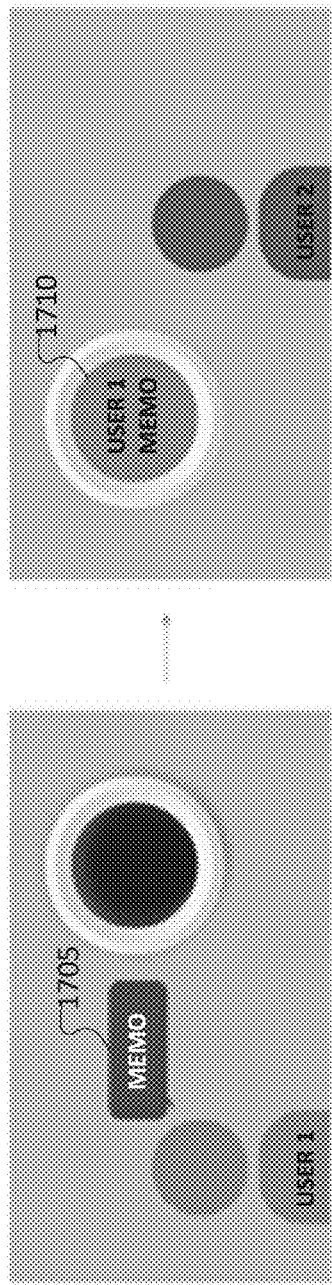
FIG. 17 illustrates an exemplary contextual messaging on a wall clock AI voice assistant according to embodiments of the present disclosure.

FIG. 17 illustrates an exemplary contextual messaging 1700 on a wall clock AI voice assistant according to embodiments of the present disclosure. The embodiment of the contextual messaging 1700 shown in FIG. 17 is for illustration only. Other embodiments of contextual messaging could be used without departing from the scope of this disclosure.

In some embodiments, the wall clock 200 can enable family memos. In some implementations, a family memo is a tailored message delivery system based on facial recognition. There are many different forms of messaging these days, but depending on how and where a message is placed, the value and meaning changes. Family messages on the fridge have special value, because it only lives in a user's family's communal space, and it is only directed to the user's family.

The wall clock 200 can store and deliver tailored memos 1705 from one user to another user(s) living in or occupying a same dwelling. By using proximity detection and facial recognition, the wall clock 200 can notify a second user and provide messages 1710 that have been left by a first user.

Figure 18:
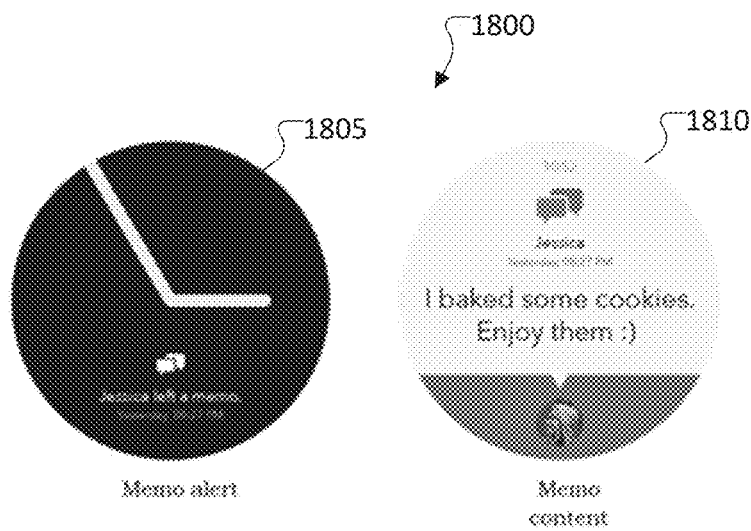
FIG. 18 illustrates an exemplary family memo on a wall clock AI voice assistant according to embodiments of the present disclosure.

FIG. 18 illustrates an exemplary family memo 1800 on a wall clock AI voice assistant according to embodiments of the present disclosure. The embodiment of the family memo 1800 shown in FIG. 18 is for illustration only. Other embodiments of family memo could be used without departing from the scope of this disclosure.

An example of a providing a family memo 1800 is illustrated in FIG. 18. The wall clock 200 can display a memo alert 1805 (e.g., "Jessica left a memo.") once a particular user that the memo is for approaches the wall clock 200 and is recognized using facial recognition. The memo content 1810 can be displayed upon a command from the identified/recognized particular user or based on a gesture, such as a hand wave or further approaching the wall clock 200 by the identified/recognized particular user.

Figure 19A:
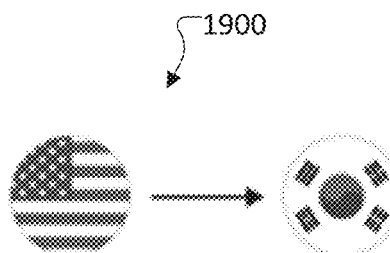
FIGS. 19A and 19B illustrate exemplary categories of language switch according to embodiments of the present disclosure.
Figure 19B:
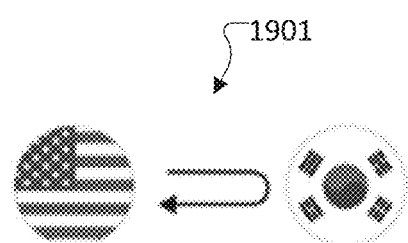

FIGS. 19A and 19B illustrate exemplary categories of language switch 1900, 1901 according to embodiments of the present disclosure. The embodiments of the language switch 1900, 1901 shown in FIG. 19 is for illustration only. Other embodiments of language switch could be used without departing from the scope of this disclosure.

Language switch in accordance with the disclosed technology provides a streamlined multiple language communication feature. The inclusive experience is directed to a conversational nature of the wall clock 200 aimed to bring different people together. The wall clock 200 can create an inclusive experience where everyone can participate. To optimize the inclusive experience in a multi-cultural world, the wall clock 200 can understand multiple languages seamlessly.

One example of language switch is a full change 1900. A full change 1900 only allows the user to use one language at a time. Also, in some cases, the full change 1900 requires a manual command. The wall clock 200 can use a multi-switch change 1901. The multi-switch change 1901 provides the wall clock 200 with an ability to toggle among different languages, such as automatically switching to a language in which to respond based on the language of a user input (e.g., if a user utters "Hello [Wake Word]", "Hey [Wake Word]", "Hi [Wake Word]", or "Okay [Wake Word]", etc., then the wall clock 200 will respond back in English).

Figure 20:
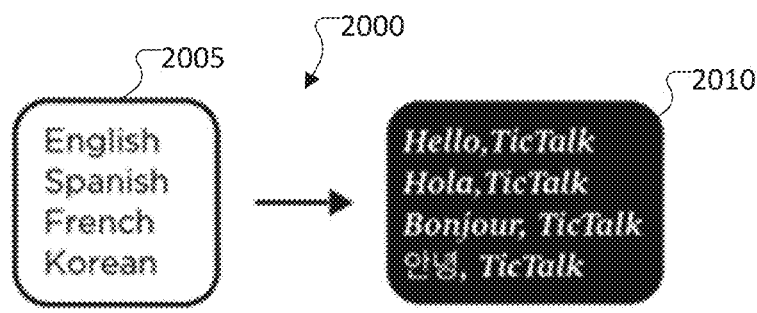
FIG. 20 illustrates an exemplary language switch on a wall clock AI voice assistant according to embodiments of the present disclosure.

FIG. 20 illustrates an exemplary language switch 2000 on a wall clock AI voice assistant according to embodiments of the present disclosure. The embodiments of the language switch 2000 shown in FIG. 20 is for illustration only. Other embodiments of language switch could be used without departing from the scope of this disclosure.

To toggle between different languages, the wall clock 200 can listen to a specific unique command. The multi-switch change 1901 ability of the wall clock 200 can include a number of programmed languages 2005 and the corresponding example user input 2010 in each language. The multi-switch change 1901 ability of the wall clock 200 can allow a user to communicate in one or more languages by initiating a conversation by saying "[the greeting word of a specific language]+[clock name or assistant name or wake word]".

Figure 21:
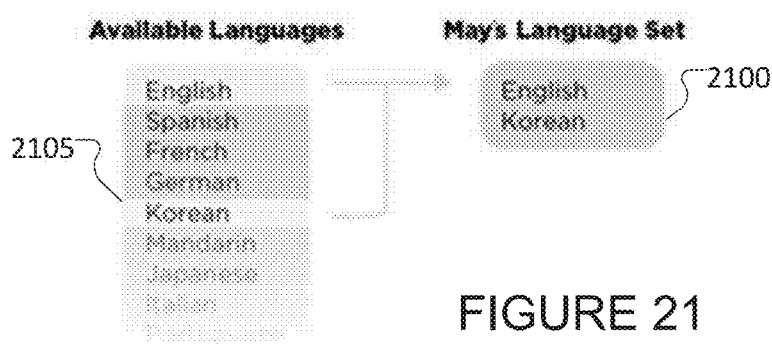
FIG. 21 illustrates an exemplary language set on a wall clock AI voice assistant according to embodiments of the present disclosure.

FIG. 21 illustrates an exemplary language set on a wall clock AI voice assistant according to embodiments of the present disclosure. The embodiment of the language set shown in FIG. 21 is for illustration only. Other embodiments of language set could be used without departing from the scope of this disclosure.

The language switch is done by listening to the awake (or wake) words of the language in a particular users' language set 2100. The user's language set 2100 is a group of the user's preferred languages for communication. The user's personalized language set 2100 can be set by an identified user from an available language list 2105 operable with the wall clock 200. With the personalized language set 2100, a user can inform the wall clock 200 to which key words and in which languages to listen.

FIGS. 22A and 22B illustrate exemplary language switch interfaces 2200, 2201 on a wall clock AI voice assistant according to embodiments of the present disclosure. The embodiment of the language switch interfaces 2200, 2201 shown in FIGS. 22A and 22B are for illustration only. Other embodiments of language switch interfaces could be used without departing from the scope of this disclosure.

In an example, an AI voice assistant of the wall clock 200 receives a user command in a first language, then the wall clock 200 proceeds to respond both visually and auditory in the first language.

Continuing with the example, the wall clock 200 can receive another command in a second language. The wall clock 200 switches to the recognized second language and provides the displayed and auditory information in the second language. Once the inquiry is completed, the wall clock 200 can remain in the second language or switch back to the first language.

Figure 23:
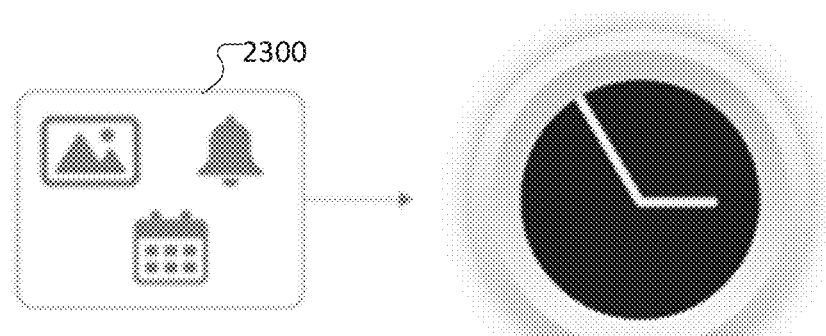
FIG. 23 illustrates an exemplary ability to learn or infer a user data by a wall clock AI voice assistant according to embodiments of the present disclosure.

FIG. 23 illustrates an exemplary ability of a wall clock AI voice assistant 200 to learn or infer a user's behaviors, usage patterns, profile data, and/or other features 2300 according to embodiments of the present disclosure. The example shown in FIG. 23 is for illustration only. Other examples could be used without departing from the scope of this disclosure.

User data 2300 can include be information regarding important days or moments in the life of a user, such as a reminder of an anniversary or the like. A "day to remember" feature provides a photo celebration of a memorable past or a special occasion. Life can be about the moments that make it special, and these are the moments that give people the opportunity to connect and communicate. Remembering that special day can be a delightful experience that brings tremendous value to life.

Utilizing user data provided by or inferred from a user, the wall clock 200 can learn about the important days and moments that occur in the user's life. When the timing is right, the wall clock can display a special reminder based on the user data 2300. The user data 2300 can be associated with pictures, videos, alarms, calendar events, etc.

Figure 24:
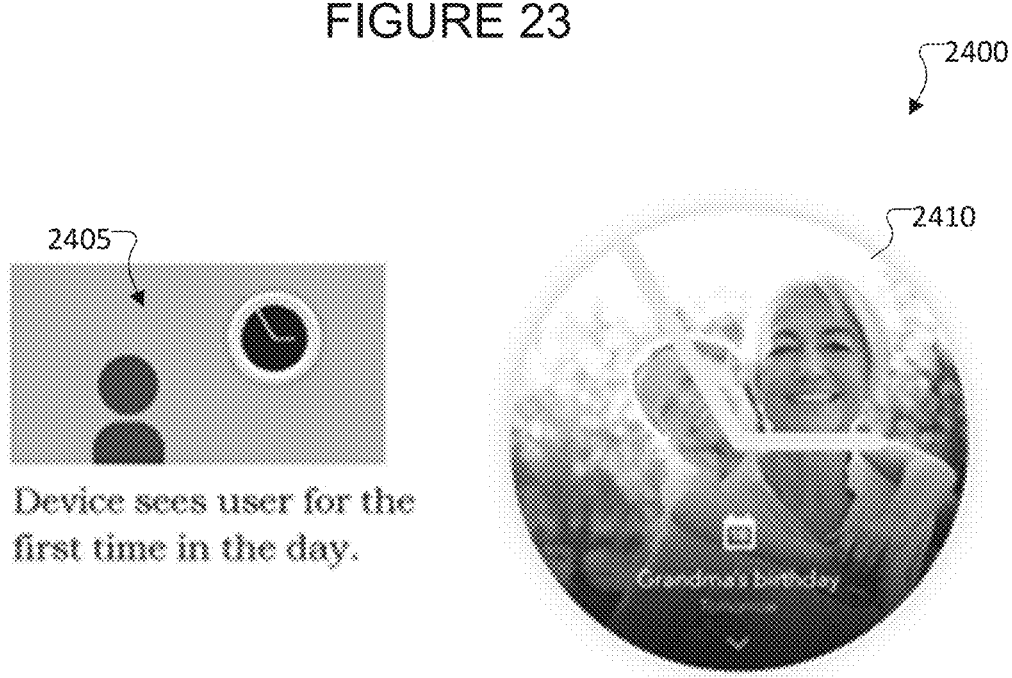
FIG. 24 illustrates an exemplary event notification on a wall clock AI voice assistant according to embodiments of the present disclosure.

FIG. 24 illustrates an exemplary event notification 2400 on a wall clock AI voice assistant according to embodiments of the present disclosure. The embodiment of the event notification 2400 shown in FIG. 24 is for illustration only. Other embodiments of event notification could be used without departing from the scope of this disclosure.

In the event notification example 2400, the wall clock 200 performs an initial recognition event 2405. The initial recognition event 2405 can occur, for example, the first time a user is recognized on a specific day. The user then gets a special reminder 2410 about a significant event. This special reminder 2410 can be associated with the "day to remember" feature of the disclosed technology. The entire screen can be utilized with the clock hands in position for a subtle and silent information delivery.

Figure 25A:
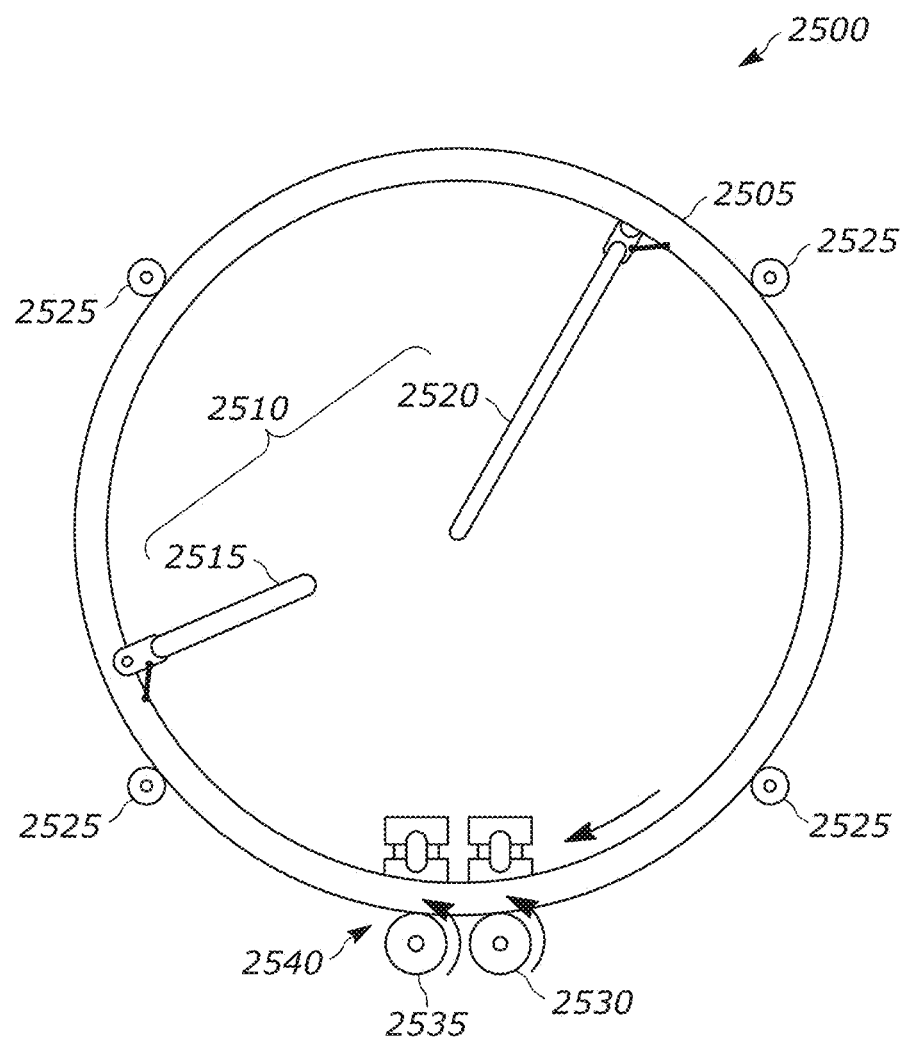
FIGS. 25A and 25B illustrate exemplary ring configurations of a wall clock AI voice assistant according to embodiments of the present disclosure.
Figure 25B:
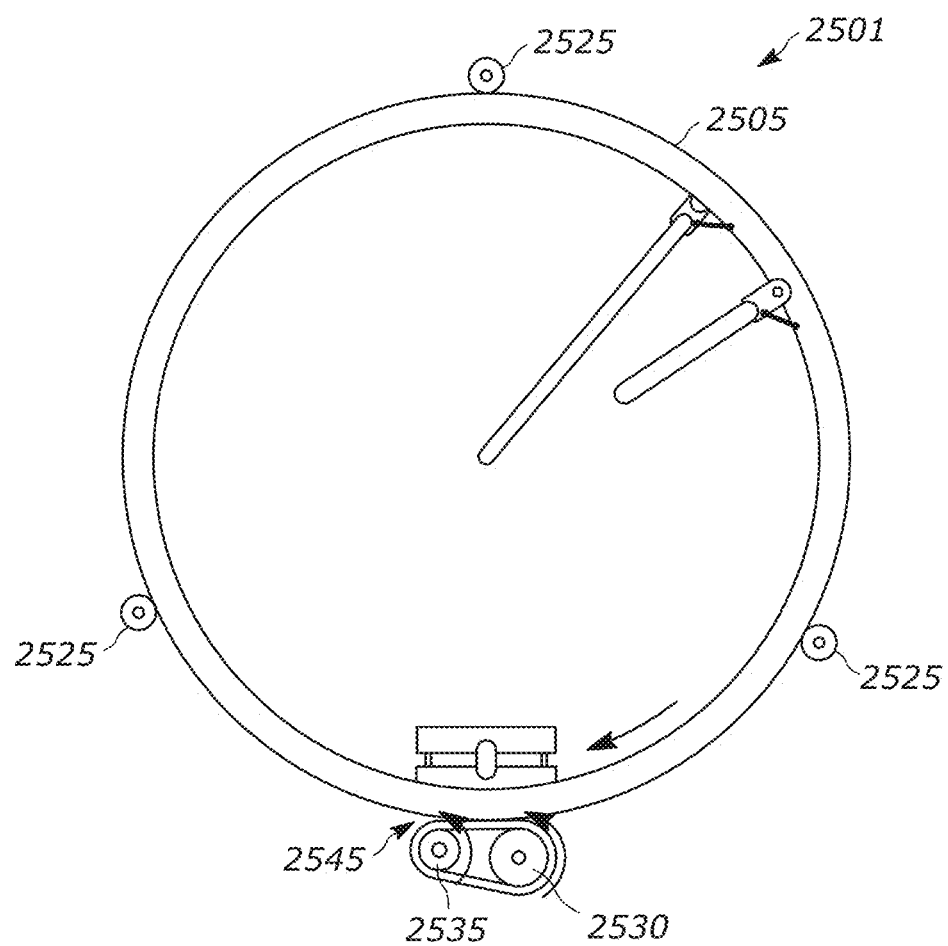

FIGS. 25A and 25B illustrate exemplary ring configurations 2500, 2501 of a wall clock AI voice assistant according to embodiments of the present disclosure. The example embodiments of the ring configurations 2500, 2501 shown in FIGS. 25A and 25B are for illustration only. Other embodiments of ring configurations could be used without departing from the scope of this disclosure.

The ring configuration 2500 includes a plurality of rings 2505 (e.g., in the example front or top/bird's eye view of FIG. 25A, there can be two rings overlaying each other: one ring in the front or on top for the hour hand and one ring in the back or on the bottom for the minute hand, or vice versa), a plurality of clock hands 2510 including an hour hand 2515 and a minute hand 2520, a plurality of rollers 2525 (e.g., four rollers shown in FIG. 25A), an hour hand drive wheel 2530, a minute hand drive wheel 2535, and a two motor assembly 2540. The motor assembly can be controlled by at least one processor. The motor assembly, drive wheels, and the rollers can enable each ring 2505 to rotate (independently as needed). As each ring 2505 rotates, the respective clock hand 2510 attached to each ring 2505 can rotate as well (e.g., clockwise), thereby indicating the analog time. The ring configuration 2501 includes a plurality of rings 2505 (e.g., in the example front or top/bird's eye view of FIG. 25B, there can be two rings overlaying each other: one ring in the front or on top for the hour hand and one ring in the back or on the bottom for the minute hand, or vice versa), a plurality of clock hands including an hour hand and a minute hand, a plurality of rollers 2525 (e.g., three rollers shown in FIG. 25A), an hour hand drive wheel 2530, a minute hand drive wheel 2535, and a one motor assembly 2545 with a belt reduction or a gear reduction between drive wheels.

The wall clock 200 tells time like an analog clock when not actively being used (e.g., queried) by the user, as a way to save power since the display screen does not have to be powered on. The screen being powered off also makes the wall clock 200 feel more familiar and luxurious, and adds a sense of playfulness to the device when the user sees the clock hands 2510 move.

The clock hands 2510 can hide behind a bezel of the wall clock 200. Each of the hour hand 2515 and the minute hand 2520 are attached to a respective one of the rings 2505 that are centered on the display 325. The rings 2505 are driven (spun) by a motor assembly 2540, 2545, which can be controlled by one or more processors of the wall clock 200. The clock hands 2510 are hinged and sprung, and run into an actuated post (i.e., a stop, an actuator, etc.) that causes them to fold up underneath the bezel 305 or display mask 320. The actuators can be placed to cause the hands to fold and become hidden on demand. With this example, power can be applied to the actuators, such as to cause them to raise or recede/flatten.

The two motor assembly 2540 includes a motor for each of the rings 2505. Each motor can independently rotate the rings clockwise or counterclockwise. The one motor assembly 2545 includes one motor with a belt or gear reduction between the hour hand drive wheel 2530 and the minute hand drive wheel 2535. The belt or gear reduction provides for a 12 to 1 gear ratio. That is, for every full rotation of the hour hand 2515, the minute hand 2520 completes twelve full rotations.

The clock hands 2510 can indicate a time of the day. For example, the hour hand 2515 can point to the current hour of the day on the clock and the minute hand 2520 can point to the current minute of the hour on the clock.

The clock hands 2510 can be manipulated with the display to provide visual interaction. The visual interaction can be a counter (e.g., a meter or gauge where at least one of the clock hands 2510 indicate progress and where a circular or semi-circular progress bar can be displayed via the display screen) or other interactive display with the clock hands 2510. For example, the clock hands 2510 can rotate to make an interface appear as if being created by the clock hands 2510.

Figure 26A:
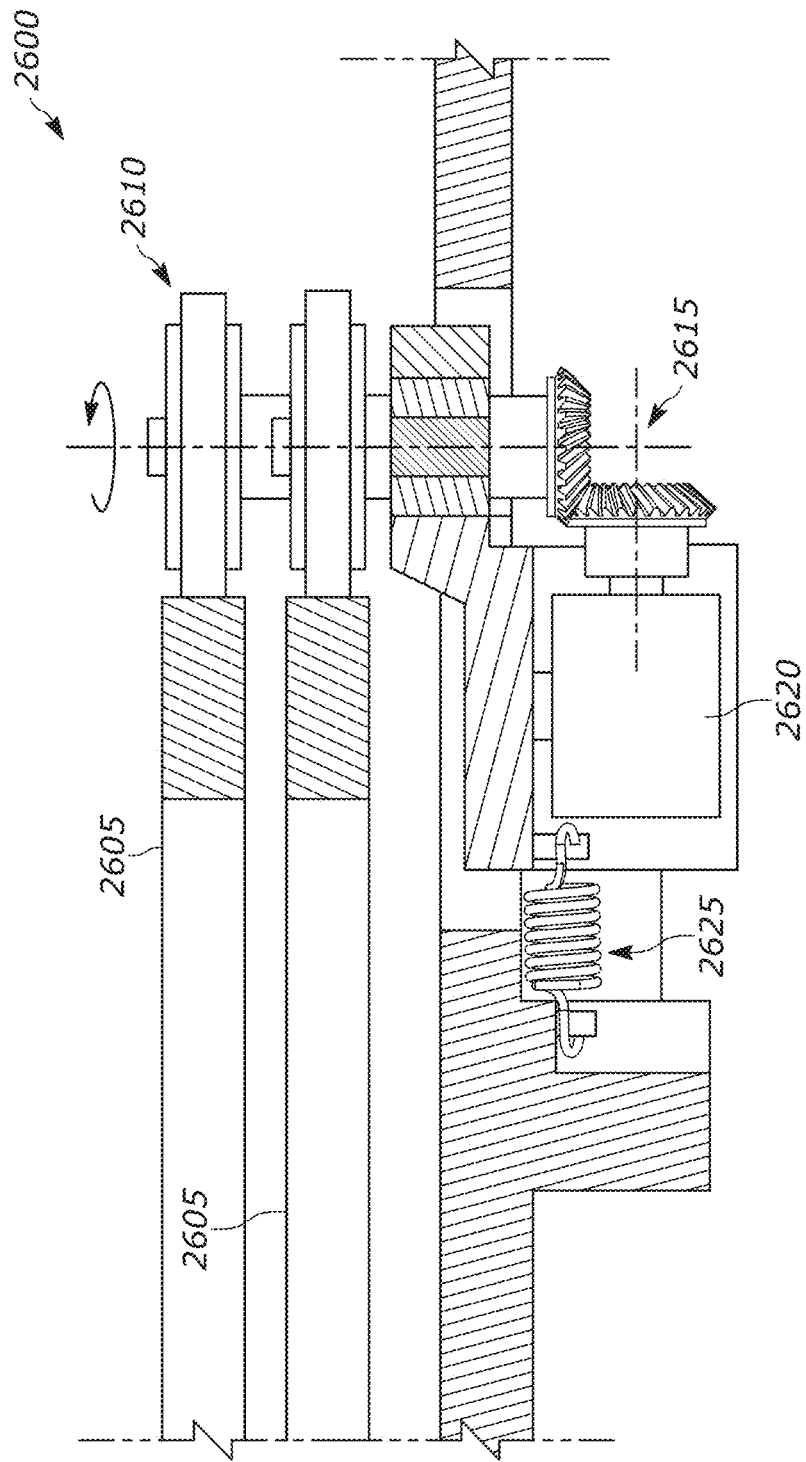
FIGS. 26A and 26B illustrate an exemplary dual driving mechanism of a wall clock AI voice assistant according to embodiments of the present disclosure.
Figure 26B:
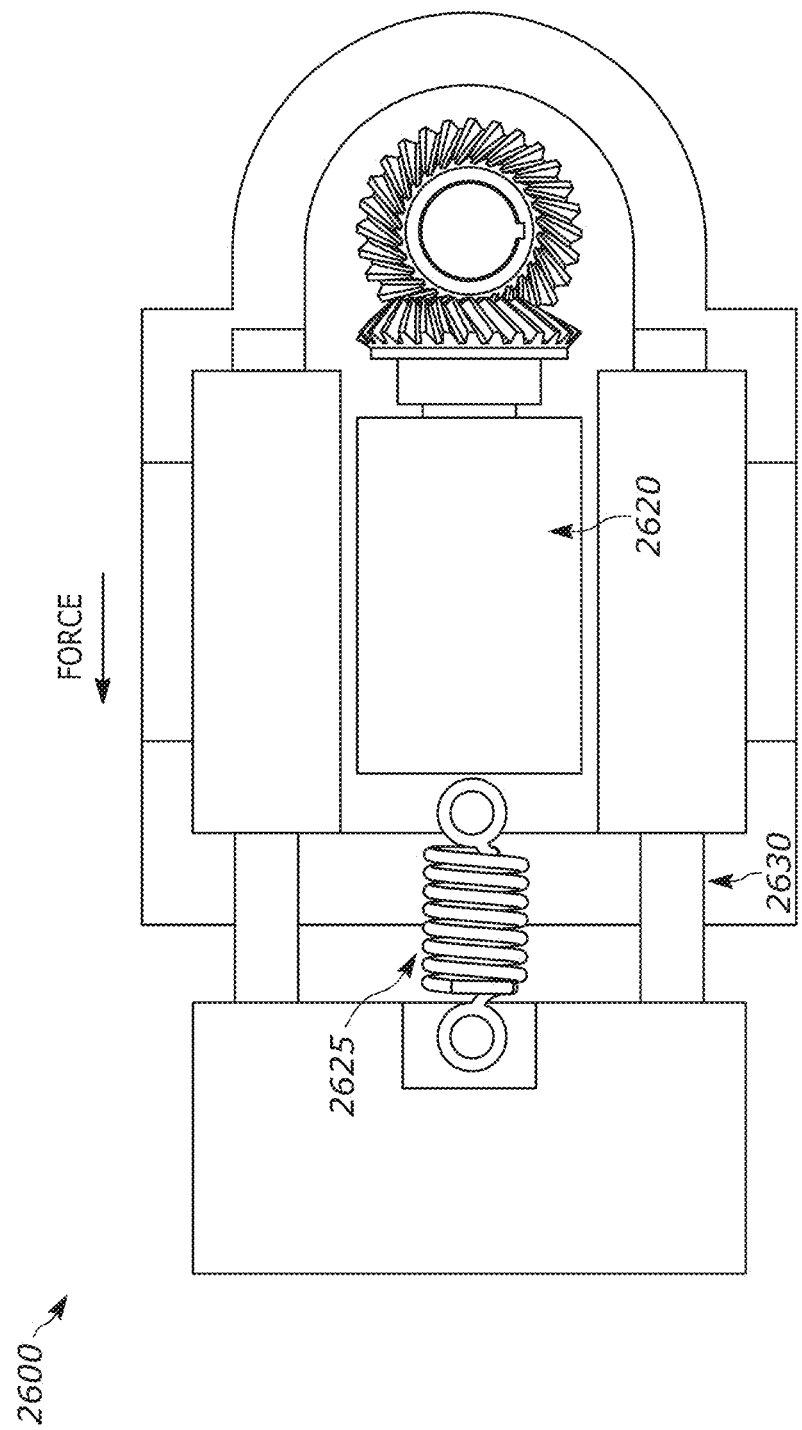
Figure 27A:
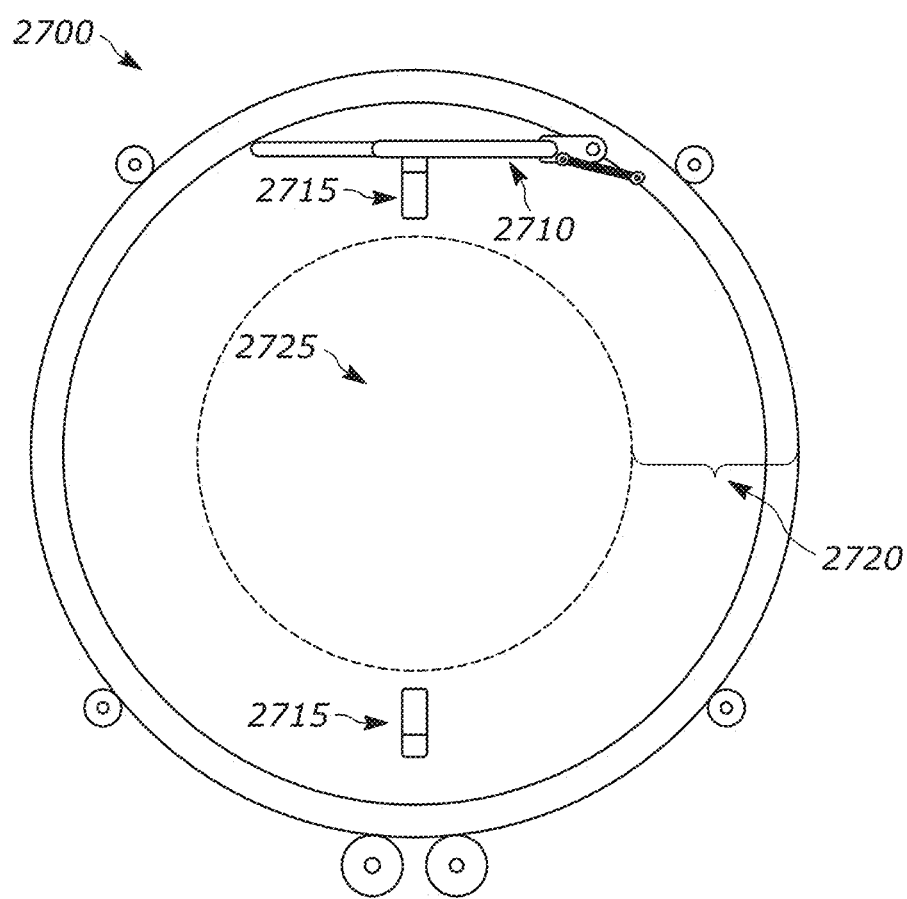
FIGS. 27A, 27B, 27C, 27D, 27E, and 27F illustrate an exemplary clock hand hiding of a wall clock AI voice assistant according to embodiments of the present disclosure.
Figure 27B:
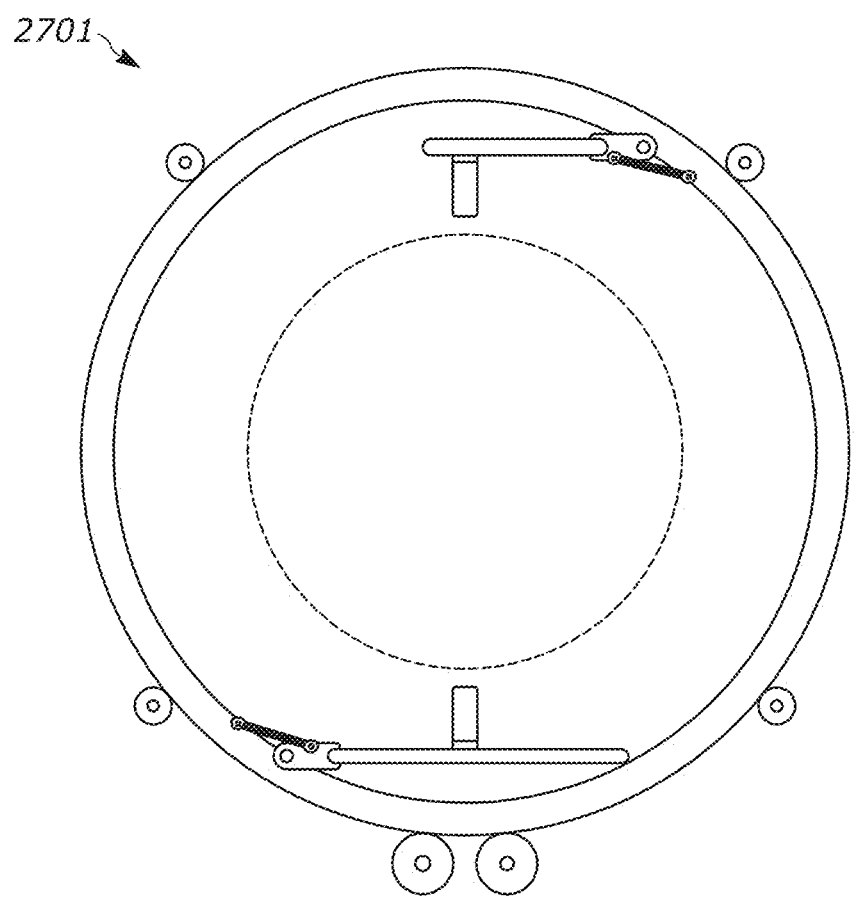
Figure 27C:
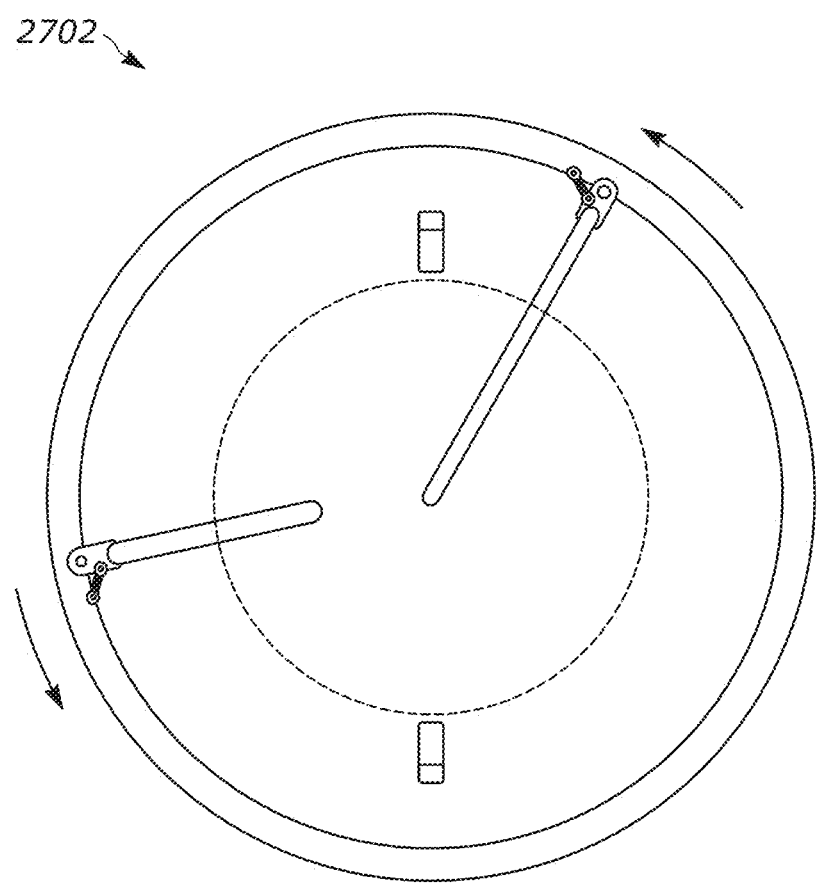
Figure 27D:
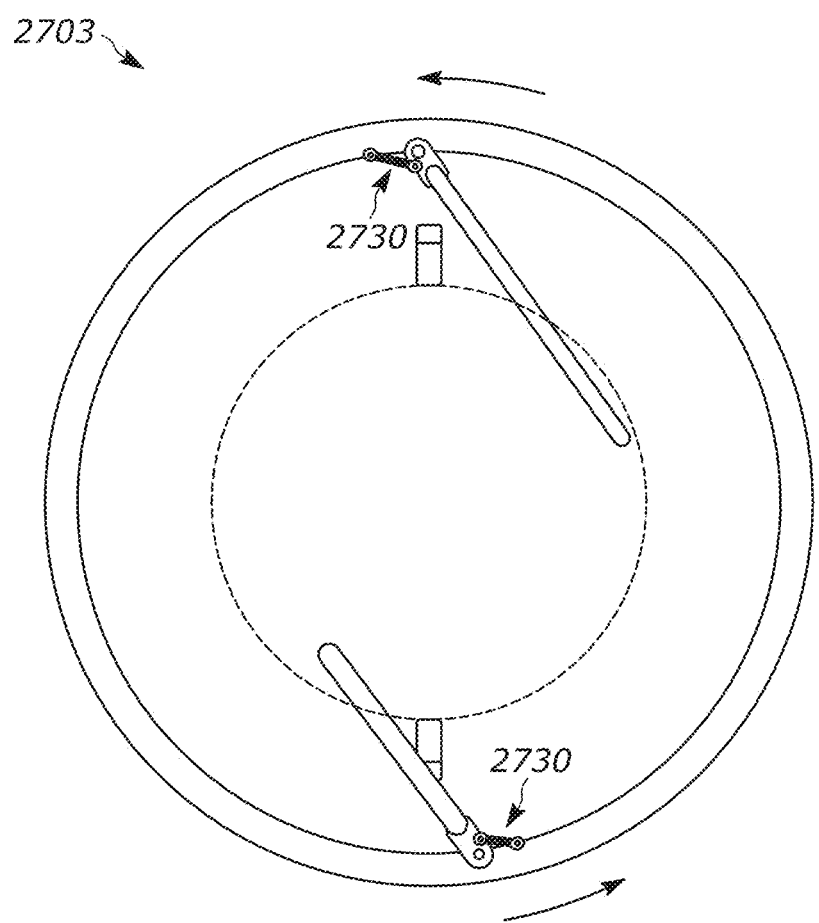
Figure 27E:
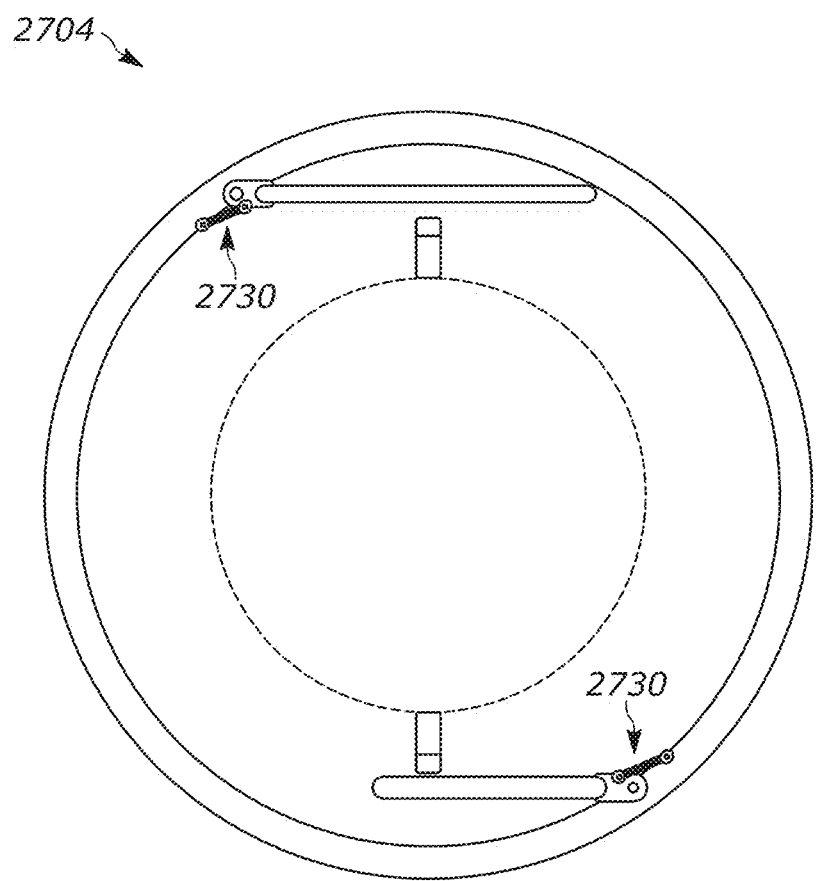
Figure 27F:
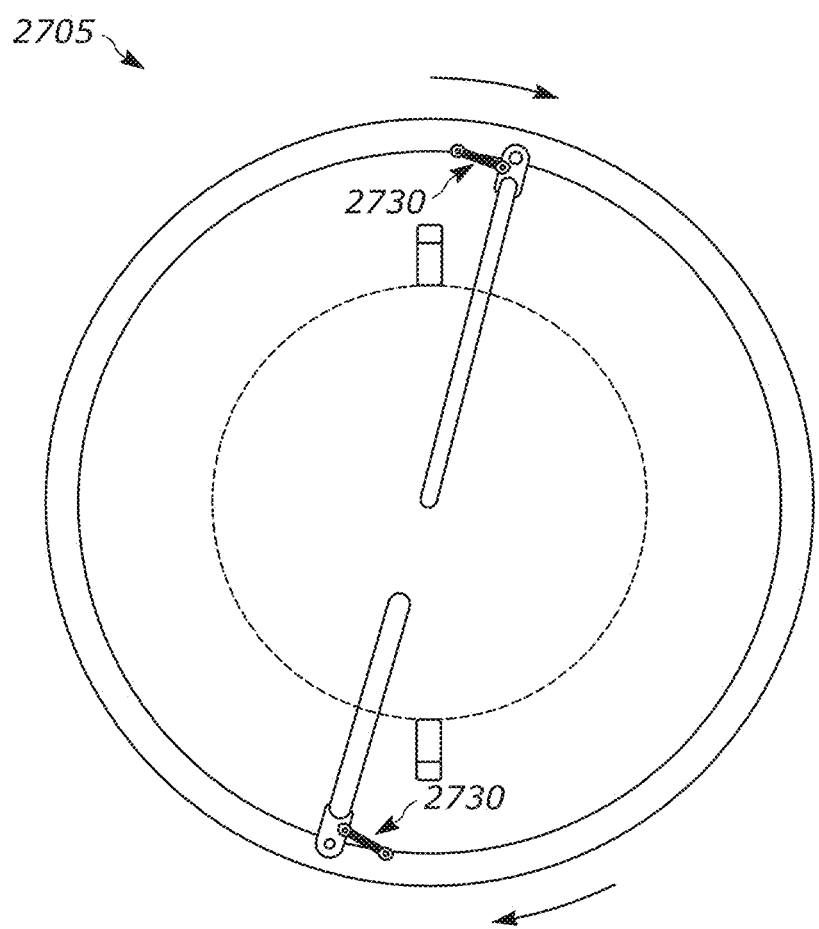

FIGS. 26A and 26B illustrate an exemplary dual driving mechanism configuration 2600 of a wall clock AI voice assistant according to embodiments of the present disclosure. The embodiments of the dual driving mechanism configuration 2600 shown in FIGS. 26A and 26B are for illustration only. Other embodiments of dual driving mechanism configurations could be used without departing from the scope of this disclosure.

FIG. 26A illustrates a side view of the example dual driving mechanism configuration 2600 and FIG. 26B illustrates a bottom view of the dual driving mechanism configuration 2600. The dual driving mechanism configuration 2600 for the rings 2605 can include a drive wheel 2610, bevel gears 2615, a servomotor 2620, a spring 2625 and a linear shaft 2630. The servomotor 2620 is a rotary actuator that provides the force for rotating the rings 2605. Based on the location and orientation of the servomotor 2620, the bevel gears are positioned and aligned to translate the rotation force in a perpendicular direction for rotation of the ring 2605. The translated rotation force provided from the bevel gears 2615 causes the rotation of the drive wheel 2610, which rotates the rings 2605.

FIGS. 27A-27F illustrate exemplary clock hand hiding scenarios 2700-2705 of a wall clock AI voice assistant according to embodiments of the present disclosure. The example embodiments of the clock hand hiding scenarios 2700-2705 shown in FIGS. 27A-27F are for illustration only. Other embodiments of clock hand hiding could be used without departing from the scope of this disclosure.

The non-limiting example scenario 2700 illustrates two physical clock hand stops or actuators 2715 (an upper and a lower). There can be many variations associated with the quantity, size, shape, location, and/or position of a stop/actuator. The example scenario 2700 illustrates the wall clock having both the minute hand and the hour hand folded using the same (upper) hand stop/actuator 2715. While the clock hands are in the folded position due to the upper stop/actuator 2715, the clock hands can be covered up or hidden from a user's view 2725 by a wall clock bezel (or mask) 2720 in front. It is also contemplated that the clock hands can be in another folded position based on the lower stop/actuator 2715, and the clock hands can similarly be covered up or hidden from the user's view 2725 by the wall clock bezel 2720 in front. Moreover, the example scenario 2701 illustrates the minute hand and the hour hand folded into two different hidden positions using two different hand stops 2715.

Furthermore, the example process for clock hand hiding shown in scenarios 2702-2705 illustrates the transition from the physical hands 2710 indicating the time, to becoming hidden, and then to becoming unhidden again (such as for indicating the time again). In example scenario 2702, the clock hands are indicating the time and the hand stops or actuators 2715 can be raised. The rings can rotate counterclockwise and cause the attached clock hands to move accordingly. In example scenario 2703, the hands are beginning to be folded by the raised stops or actuators 2715 as the rings continue to rotate counterclockwise. While the clock hands are being folded by the raised stops or actuators 2715 to be hidden from view, a respective spring 2730 for each clock hand (and attaching each hand to its respective ring) is stretched. In example scenario 2704, the clock hands are folded by the raised stops or actuators 2715 to be hidden from view and the respective spring 2730 for each hand is stretched. Then in example scenario 2705, the clock hands are moved away from the stops/actuators 2715 (or the stops/actuators 2715 can be receded) and the respective spring 2730 for each hand retracts to cause each hand to be unfolded and thus unhidden from view. The clock hands can then resume indicating the time. It should be understood that many variations associated with the disclosed technology are possible.

Figure 28A:
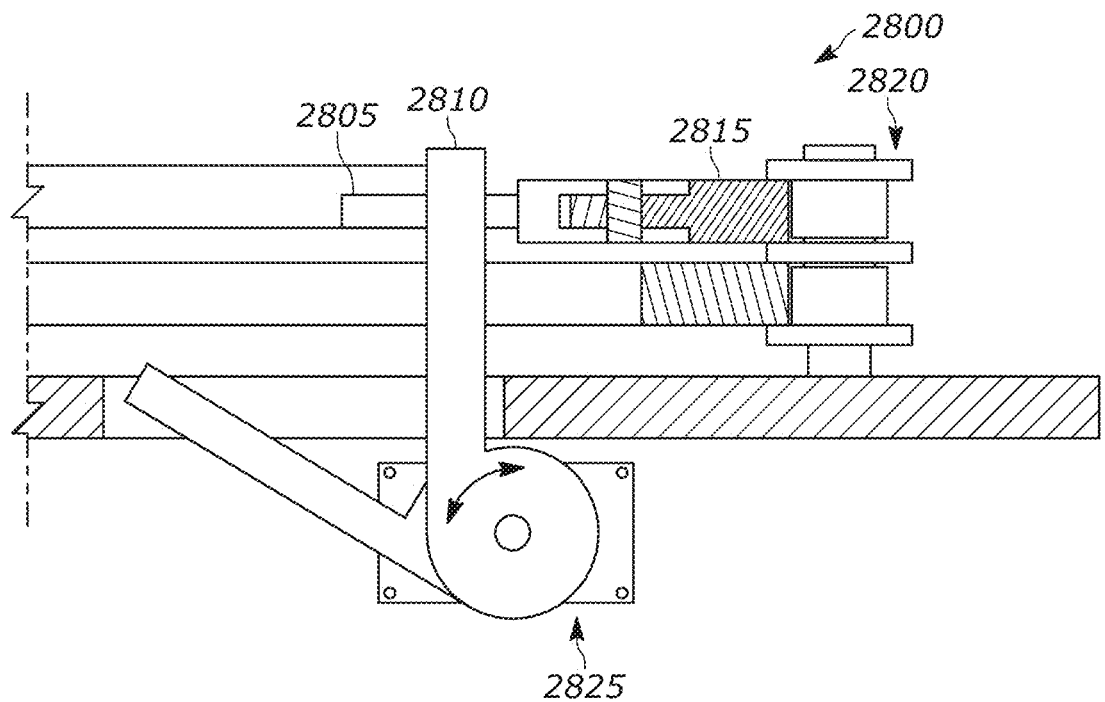
FIGS. 28A and 28B illustrate an exemplary hand rotation or hand folding of a wall clock AI voice assistant according to embodiments of the present disclosure.
Figure 28B:
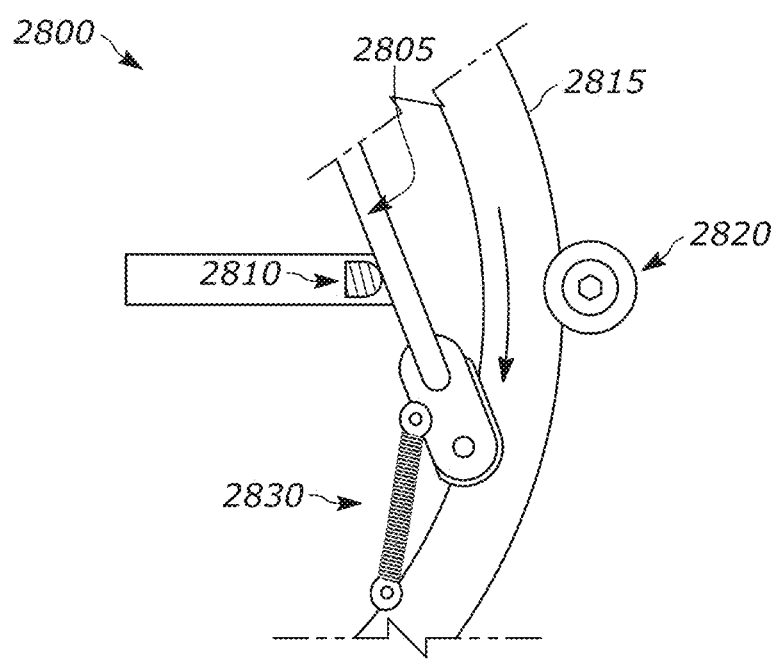

FIGS. 28A and 28B illustrate an exemplary scenario 2800 for clock hand folding of a wall clock AI voice assistant according to embodiments of the present disclosure. The embodiment of the example scenario 2800 shown in FIGS. 28A and 28B is for illustration only. Other embodiments of clock hand folding could be used without departing from the scope of this disclosure.

FIG. 28A illustrates a side view of a cross section of the wall clock in the example scenario 2800, and FIG. 28B illustrates a top or bird's eye view of the example scenario 2800. This example scenario 2800 includes a clock hand 2805, a hand stop/actuator 2810, a top ring 2815, a top roller 2820, a servomotor 2825, and a spring 2830.

The servomotor 2825 controls the activation (e.g., raising, elevating) and deactivation (e.g., receding, flattening) of the hand stop 2810. In example scenario 2800, the servomotor 2825 rotates the hand stop 2810 to a raised position when the hand 2805 is to be folded. The hand 2805 rotates with the ring 2815 out of view behind the bezel and stretches the spring 2830.

In example scenario 2800, when the hand 2805 is to be unfolded, the ring 2815 can rotate in the opposite direction (and/or the servomotor 2825 can rotate the hand stop 2810 in the opposite direction to a receded/flattened position). The spring 2830 retracts and pulls the hand 2805 to be lined back up with a center of the ring 2815.

Figure 29:
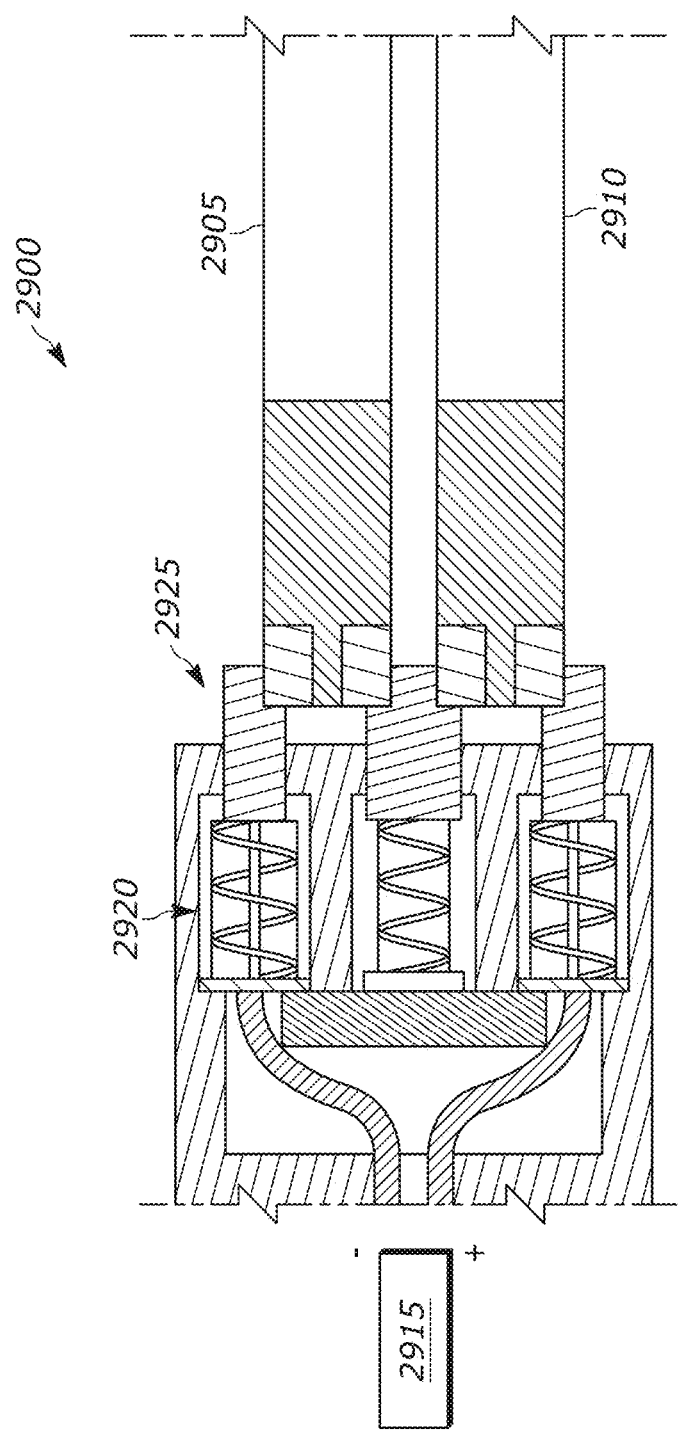
FIG. 29 illustrates an exemplary SMA brushes assembly of a wall clock AI voice assistant according to embodiments of the present disclosure.

FIG. 29 illustrates an example side view of a cross section of a wall clock AI voice assistant showing an exemplary shape memory alloy (SMA) brushes assembly 2900 of the wall clock AI voice assistant according to embodiments of the present disclosure. The embodiment of the SMA brushes assembly 2900 shown in FIG. 29 is for illustration only. Other embodiments of SMA brushes assembly could be used without departing from the scope of this disclosure.

The SMA brushes assembly 2900 includes a first ring 2905, a second ring 2910, a power supply 2915, springs 2920, and brushes 2925. The power supply 2915 provides a current through the brushes 2925 to the first ring 2905 and the second ring 2910. The springs 2920 keep the brushes 2925 connected to the first ring 2905 and the second ring 2910 for consistent power to the rings.

Figure 30A:
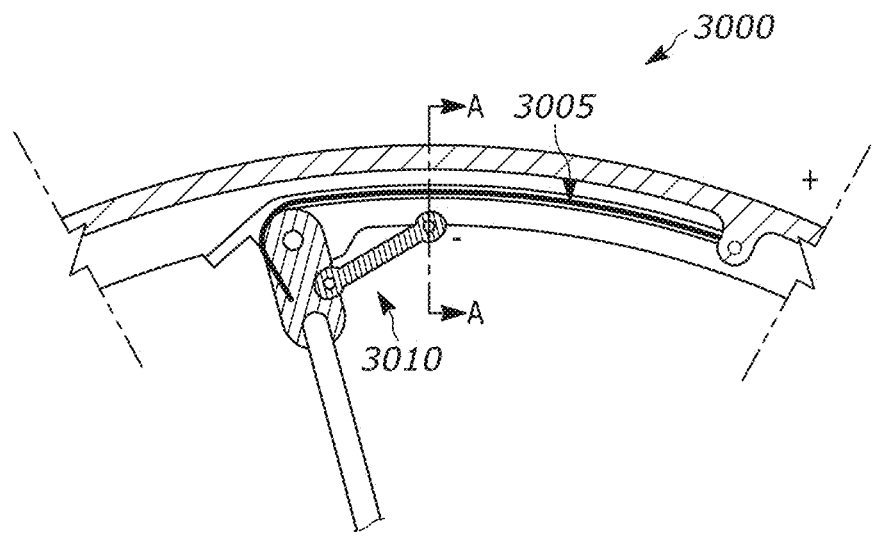
FIGS. 30A, 30B, and 30C illustrate an exemplary SMA hands of a wall clock AI voice assistant according to embodiments of the present disclosure.
Figure 30B:
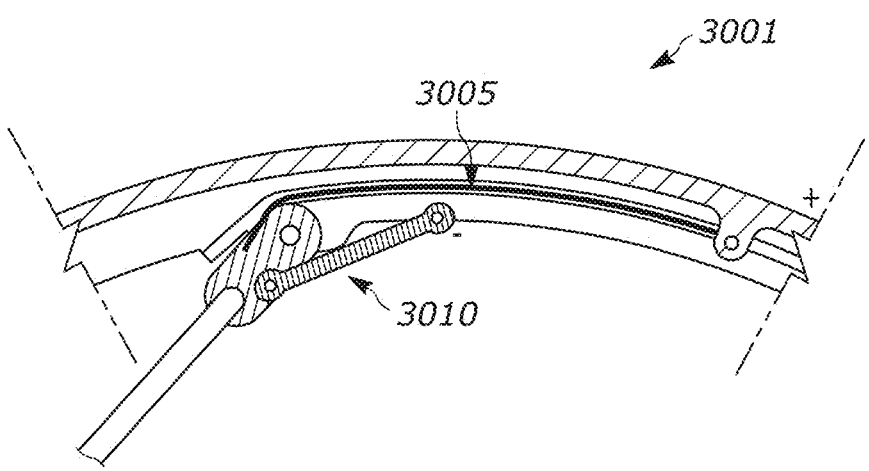
Figure 30C:
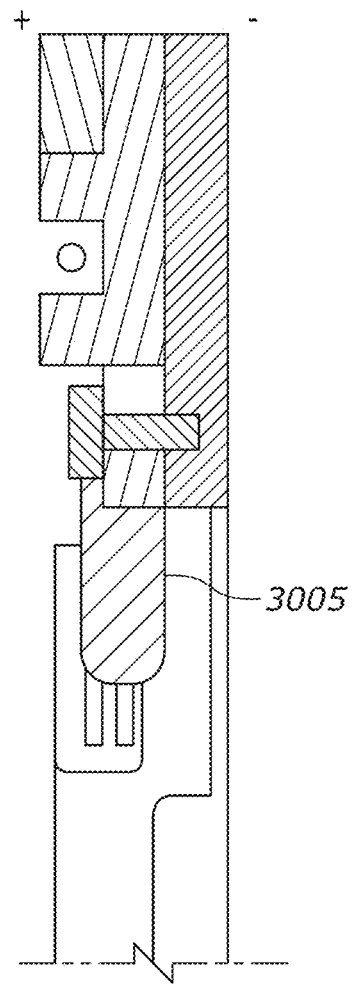

FIGS. 30A-30C illustrate exemplary SMA hands of a wall clock AI voice assistant according to embodiments of the present disclosure. The embodiments of the SMA hands shown in FIGS. 30A-30C are for illustration only. Other embodiments of SMA hands could be used without departing from the scope of this disclosure.

In certain embodiments, the wall clock's 200 control of the folding of a clock hand takes place on the ring that the hand is mounted, using a shape memory alloy (SMA) wire 3005 to pull and fold the hand into its hidden position. In the power off state 3000 in FIG. 30A, the spring 3010 is contracted and the SMA wire 3005 is in an extended state, thereby allowing the clock hand to remain unfolded and visible. In the power on state 3001 in FIG. 30B, the power is turned on, thereby contracting the SMA wire 3005, extending/stretching the spring 3010, and causing the clock hand to become folded and hidden from view. FIG. 30C illustrates a cross sectional view of an example SMA clock hand of a wall clock AI voice according to embodiments of the present disclosure.

In some embodiments, the wall clock 200 does not include physical hands. Removing the hands reduces the manufacturing cost and complexity, as well as product size. In such embodiments, the display can be positioned against the glass.

Figure 31:
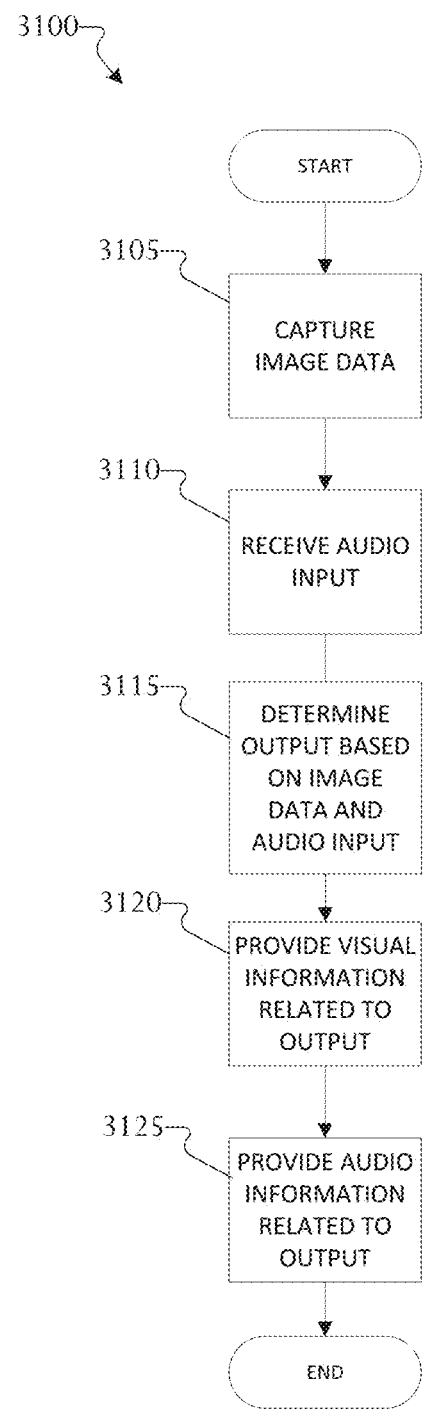
FIG. 31 illustrates a process for a wall clock AI voice assistant according to embodiments of the present disclosure.

FIG. 31 illustrates a process for a wall clock AI voice assistant according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a wall-mountable electronic clock.

In operation 3105, the wall clock 200 captures, by an optical sensor, image data representing at least a portion of a user. The image data captured by the optical sensor can be utilized in one or more computer vision processes for determining at least one of a gesture performed by the user, a distance of the user from the wall clock, a presence of the user, an identifier for the user, a presence of an object, or an identifier for the object. Other criteria could include first time a user has been detected for the day or identifying a specific user.

In operation 3110, the wall clock 200 receives, by a microphone, an audio input from the user when certain criteria is met, such as the image data representing at least a portion of the user is captured. In certain embodiments, the audio inputs from the user is associated with at least two different languages.

In operation 3115, the wall clock 200 determines an output based on the image data and the audio input. The output can be determined based on either the receiving only image data, only audio input, or a combination of image data and audio input.

In operation 3120, the wall clock 200 provides, by a display, visual information to the user provided in response to the captured image data or the audio input. The visual information provided to the user can be dynamically changed based on the distance of the user from the wall clock. The visual information can be displayed without audio interaction. Examples of visual information displayed without audio interaction could include the daily news, or other content curated by the wall clock based on past activities or curated by the user (i.e. information from a list of apps that the user has selected as relevant.

In operation 3120, the wall clock 200 provides, by a speaker, audio information provided from a digital voice assistant in response to the captured image data or the audio input. The audio information provided to the user can be dynamically changed based on the distance of the user from the wall clock.

In certain embodiments, the wall clock 200 can also illuminate an area proximate to the wall clock. The wall clock 200 can use the LED strip to illuminate the wall in different colors or colors arrays. The LED strip contains individually controllable LEDs that can function independently. For example, the LED strip can light the top of the wall clock 200 different from the bottom of the wall clock 200. The controllable lighting element is dynamically controlled based on at least one of the visual information provided to the user or the audio information to the user.

Figure 32:
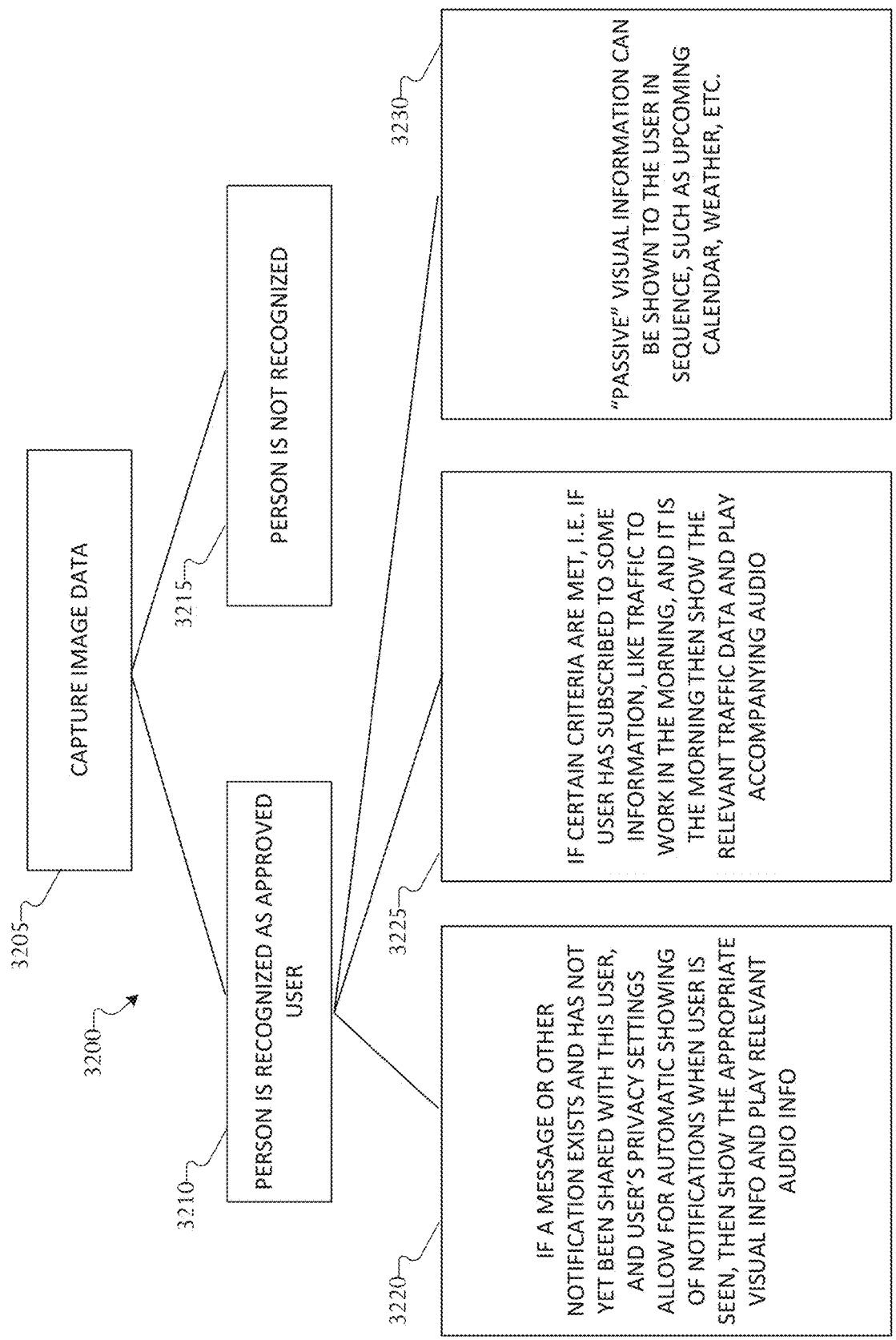
FIG. 32 illustrates a process for a wall clock AI voice assistant using captured image data according to embodiments of the present disclosure.

FIG. 32 illustrates a process for a wall clock AI voice assistant using only captured image data according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a wall-mountable electronic clock.

In operation 3205, the wall clock 200 captures, by an optical sensor, image data representing at least a portion of a user. The image data captured by the optical sensor can be utilized in one or more computer vision processes for determining at least one of a gesture performed by the user, a distance of the user from the wall clock, a presence of the user, an identifier for the user, a presence of an object, or an identifier for the object. Other criteria could include first time a user has been detected for the day or identifying a specific user.

In operation 3210, the wall clock 200 can recognize an approved user. A user can walk into a frame of the optical sensor and the wall clock 200 will analyze features of the user for authorization or approval. In operation 3215, the wall clock 200 can not recognize the user and continue functioning as if a user was not present.

The wall clock 200 provides, by a display, visual information and, by a speaker, audio information to the user provided in response to the captured image data or the audio input. In operation 3220, if a message or other notification exists and has not yet been shared with this user, and the user's privacy settings allow for automatic showing of notifications when a user is seen, then show the appropriate visual information and play the relevant audio information. In operation 3225, if certain criteria are met, i.e., if a user has subscribed to some information, like traffic to work in the morning, and it is the morning, then show the relevant traffic data and play an accompanying audio. In operation 3230, a "passive" visual information can be shown to the user in sequence, such as upcoming calendar, weather, etc.

Figure 33:
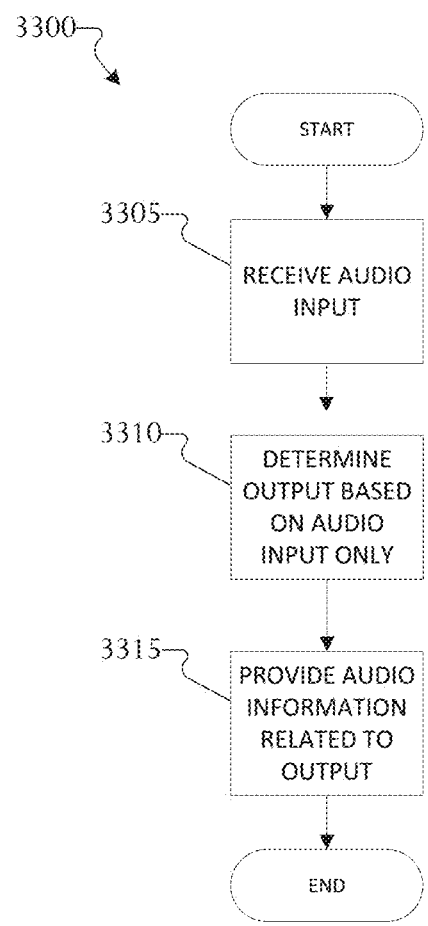
FIG. 33 illustrates a process for a wall clock AI voice assistant using only received audio input according to embodiments of the present disclosure.

FIG. 33 illustrates a process for a wall clock AI voice assistant using only received audio input according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, a wall-mountable electronic clock.

In operation 3305, the wall clock 200 receives, by a microphone, an audio input from the user when certain criteria is met, such as the image data representing at least a portion of the user is captured. In certain embodiments, the audio inputs from the user is associated with at least two different languages.

In operation 3110, the wall clock 200 determines an output based on the audio input. The output can be determined based on only audio input.

In operation 3320, the wall clock 200 provides, by a speaker, audio information provided from a digital voice assistant in response to the audio input. The audio information provided to the user can be dynamically changed based on the distance of the user from the wall clock.

Although various features have been shown in the figures and described above, various changes may be made to the figures. For example, the size, shape, arrangement, and layout of components shown in FIGS. 1 through 30, are for illustration only. Each component could have any suitable size, shape, and dimensions, and multiple components could have any suitable arrangement and layout. Also, various components in FIGS. 1 through 30 could be combined, further subdivided, or omitted and additional components could be added according to particular needs. Further, each component in a device or system could be implemented using any suitable structure(s) for performing the described function(s). In addition, whiles FIG. 31 illustrates various series of steps, various steps in FIG. 31 could overlap, occur in parallel, occur multiple times, or occur in a different order.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A wall-mountable electronic clock comprising:
   an armature configured to provide an inner mounting structure;
   a rear casing coupled to the armature and comprising one or more mounts configured to attach to a wall;
   an optical sensor configured to capture image data representing at least a portion of a user;
   at least one processor configured to perform one or more computer vision processes using the captured image data to determine a distance of the user from the wall-mountable electronic clock;
   a microphone configured to receive an audio input from the user;
   a digital display configured to provide visual information to the user, at least some of the visual information being provided in response to the captured image data or the audio input, wherein the at least one processor is configured to dynamically change a level of detail of the visual information provided to the user by the digital display based on the distance of the user from the wall-mountable electronic clock; and
   a speaker configured to provide audio information to the user, at least some of the audio information being provided from a digital voice assistant in response to the captured image data or the audio input, wherein the at least one processor is configured to dynamically change a level of detail of the audio information provided to the user by the speaker based on the distance of the user from the wall-mountable electronic clock.

2. The wall-mountable electronic clock of claim 1, further comprising:
   one or more physical clock hands configured to indicate a time,
   wherein the digital display is further configured to provide a visual interaction with the one or more physical clock hands.

3. The wall-mountable electronic clock of claim 1, wherein the at least one processor is configured to perform the one or more computer vision processes using the captured image data to determine at least one of a gesture performed by the user, a presence of the user, an identifier for the user, a presence of an object, or an identifier for the object.

4. The wall-mountable electronic clock of claim 1, further comprising:
   a controllable lighting element configured to illuminate an area proximate to the wall-mountable electronic clock.

5. The wall-mountable electronic clock of claim 4, wherein the controllable lighting element is dynamically controllable based on at least one of the visual information provided to the user or the audio information provided to the user.

6. The wall-mountable electronic clock of claim 1, wherein the audio input from the user is associated with at least two different languages.

7. The wall-mountable electronic clock of claim 1, wherein, to dynamically change the level of detail of the visual information provided to the user based on the distance of the user from the wall-mountable electronic clock, the digital display is configured to:
   display a first quantity of text information in one or more fonts having a first size in response to the user being within a first distance from the wall-mountable electronic clock; and
   display a second quantity of text information in one or more fonts having a second size in response to the user being within a second distance from the wall-mountable electronic clock.

8. The wall-mountable electronic clock of claim 1, wherein the at least one processor is configured to dynamically change the level of detail of the visual information to be more detailed when the at least one processor dynamically changes the level of detail of the audio information to be less detailed.

9. A method for a wall-mountable electronic clock comprising:
   capturing, by an optical sensor within an armature of the wall-mountable electronic clock, image data representing at least a portion of a user, wherein the armature is configured to provide an inner mounting structure and is coupled to a rear casing comprising one or more mounts configured to attach to a wall;
   performing, by at least one processor, one or more computer vision processes using the captured image data to determine a distance of the user from the wall-mountable electronic clock;
   receiving, by a microphone of the wall-mountable electronic clock, an audio input from the user;
   providing, by a digital display of the wall-mountable electronic clock, visual information to the user and dynamically changing a level of detail of the visual information provided to the user by the digital display based on the distance of the user from the wall-mountable electronic clock, at least some of the visual information being provided in response to the captured image data or the audio input; and
   providing, by a speaker of the wall-mountable electronic clock, audio information to the user, at least some of the audio information being provided from a digital voice assistant in response to the captured image data or the audio input and dynamically changing a level of detail of the audio information provided to the user by the speaker based on the distance of the user from the wall-mountable electronic clock.

10. The method for the wall-mountable electronic clock of claim 9, further comprising:
    indicating, by one or more physical clock hands of the wall-mountable electronic clock, a time; and
    providing, by the digital display, a visual interaction with the one or more physical clock hands.

11. The method for the wall-mountable electronic clock of claim 9, further comprising:
    performing the one or more computer vision processes using the captured image data to determine at least one of a gesture performed by the user, a presence of the user, an identifier for the user, a presence of an object, or an identifier for the object.

12. The method for the wall-mountable electronic clock of claim 9, further comprising:
    illuminating, by a controllable lighting element of the wall-mountable electronic clock, an area proximate to the wall-mountable electronic clock.

13. The method for the wall-mountable electronic clock of claim 12, wherein the controllable lighting element is dynamically controlled based on at least one of the visual information provided to the user or the audio information provided to the user.

14. The method for the wall-mountable electronic clock of claim 9, wherein the audio input from the user is associated with at least two different languages.

15. The method for the wall-mountable electronic clock of claim 9, wherein the level of detail of the visual information is dynamically changed to be more detailed when the level of detail of the audio information is dynamically changed to be less detailed.

16. A non-transitory computer readable medium comprising instructions that, when executed by a processor, are configured to cause the processor to:
    capture, using an optical sensor of a wall-mountable electronic clock, image data representing at least a portion of a user, wherein the wall-mountable electronic clock comprises:
       an armature configured to provide an inner mounting structure; and
       a rear casing coupled to the armature and comprising one or more mounts configured to attach to a wall;
    perform one or more computer vision processes using the captured image data to determine a distance of the user from the wall-mountable electronic clock;
    receive, using a microphone of the wall-mountable electronic clock, an audio input from the user;
    provide, using a digital display of the wall-mountable electronic clock, visual information to the user and dynamically change a level of detail of the visual information provided to the user by the digital display based on the distance of the user from the wall-mountable electronic clock, at least some of the visual information being provided in response to the captured image data or the audio input; and
    provide, using a speaker of the wall-mountable electronic clock, audio information to the user, at least some of the audio information being provided from a digital voice assistant in response to the captured image data or the audio input and dynamically change a level of detail of the audio information provided to the user by the speaker based on the distance of the user from the wall-mountable electronic clock.

17. The non-transitory computer readable medium of claim 16, wherein the instructions further cause the processor to:
    indicate, using one or more physical clock hands of the wall-mountable electronic clock, a time, and
    provide, using the digital display, a visual interaction with the one or more physical clock hands.

18. The non-transitory computer readable medium of claim 16, wherein the instructions, when executed by the processor, are further configured to cause the processor to:
    perform the one or more computer vision processes using the captured image data to determine at least one of a gesture performed by the user, a presence of the user, an identifier for the user, a presence of an object, or an identifier for the object.

19. The non-transitory computer readable medium of claim 16, wherein the instructions, when executed by the processor, are further configured to cause the processor to:
   illuminate, using a controllable lighting element of the wall-mountable electronic clock, an area proximate to the wall-mountable electronic clock.

20. The non-transitory computer readable medium of claim 19, wherein the controllable lighting element is dynamically controllable based on at least one of the visual information provided to the user or the audio information provided to the user.

21. The non-transitory computer readable medium of claim 16, wherein the instructions when executed are configured to cause the processor to dynamically change the level of detail of the visual information to be more detailed when the processor dynamically changes the level of detail of the audio information to be less detailed.

* * * * *